(12) United States Patent
Zargahi et al.

(10) Patent No.: US 11,544,499 B2
(45) Date of Patent: Jan. 3, 2023

(54) CLASSIFICATION OF SYNTHETIC DATA TASKS AND ORCHESTRATION OF RESOURCE ALLOCATION

(71) Applicant: MICROSOFT TECHNOLOGY LICENSING, LLC, Redmond, WA (US)

(72) Inventors: Kamran Zargahi, Bellevue, WA (US); Sam Chan, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/206,732

(22) Filed: Nov. 30, 2018

(65) Prior Publication Data

US 2020/0089541 A1    Mar. 19, 2020

Related U.S. Application Data

(60) Provisional application No. 62/732,949, filed on Sep. 18, 2018.

(51) Int. Cl.
*G06K 9/62* (2022.01)
*G06F 16/907* (2019.01)
(Continued)

(52) U.S. Cl.
CPC ......... *G06K 9/6257* (2013.01); *G06F 9/4881* (2013.01); *G06F 9/5027* (2013.01);
(Continued)

(58) Field of Classification Search
None
See application file for complete search history.

(56) References Cited

U.S. PATENT DOCUMENTS 8,392,927 B2 * 3/2013 Rolia ............... G06F 9/5027
                                                  718/104
9,430,280 B1    8/2016 Shih et al.
(Continued)

OTHER PUBLICATIONS

Farooqui, et al., "Accelerating Data Analytics on Integrated GPU Platforms via Runtime Specialization", In International Journal of Parallel Programming, vol. 46, Issue 2, Dec. 28, 2016, pp. 336-375.
(Continued)

*Primary Examiner* — Wynuel S Aquino
(74) *Attorney, Agent, or Firm* — Shook, Hardy & Bacon L.L.P.

(57) ABSTRACT

Various techniques are described for classifying synthetic data tasks and orchestrating a resource allocation between groups of eligible resources for processing the synthetic data tasks. Received synthetic data tasks can be classified by identifying a task category and a corresponding group of eligible resources (e.g., processors) for processing synthetic data tasks in the task category. For example, synthetic data tasks can include generation of source assets, ingestion of source assets, identification of variation parameters, variation of variation parameters, and creation of synthetic data. Certain categories of synthetic data tasks can be classified for processing with a particular group of eligible resources. For example, tasks to ingest synthetic data assets can be classified for processing on a CPU only, while a task to create synthetic data assets can be classified for processing on a GPU only. The synthetic data tasks can be queued and routed for processing by an eligible resource.

20 Claims, 25 Drawing Sheets

(51) Int. Cl.

| | |
|---|---|
| G06N 20/00 | (2019.01) |
| G06F 16/9038 | (2019.01) |
| G06F 9/48 | (2006.01) |
| G06F 9/50 | (2006.01) |
| G06F 9/54 | (2006.01) |
| G06F 16/906 | (2019.01) |
| H04L 67/63 | (2022.01) |
| G06F 9/38 | (2018.01) |

(52) U.S. Cl.
CPC ............ *G06F 9/5055* (2013.01); *G06F 9/542* (2013.01); *G06F 16/906* (2019.01); *G06F 16/907* (2019.01); *G06F 16/9038* (2019.01); *G06K 9/6262* (2013.01); *G06K 9/6263* (2013.01); *G06K 9/6267* (2013.01); *G06N 20/00* (2019.01); *H04L 67/63* (2022.05); *G06F 9/3877* (2013.01)

(56) References Cited

U.S. PATENT DOCUMENTS

| | | |
|---|---|---|
| 10,068,385 B2 | 9/2018 | Bleiweiss et al. |
| 10,235,601 B1 | 3/2019 | Wrenninge et al. |
| 10,382,799 B1 | 8/2019 | Walters et al. |
| 2005/0138170 A1 | 6/2005 | Cherkasova et al. |
| 2006/0168467 A1* | 7/2006 | Couturier ............ G06F 11/3414 714/4.2 |
| 2006/0200433 A1 | 9/2006 | Flinn et al. |
| 2011/0320520 A1 | 12/2011 | Jain |
| 2014/0079314 A1 | 3/2014 | Yakubovich et al. |
| 2016/0055612 A1 | 2/2016 | Barik et al. |
| 2017/0169620 A1 | 6/2017 | Bleiweiss et al. |
| 2017/0212598 A1 | 7/2017 | Protter |
| 2017/0212884 A1 | 7/2017 | Kim et al. |
| 2018/0018610 A1 | 1/2018 | Del Balso et al. |
| 2018/0024869 A1 | 1/2018 | John et al. |
| 2018/0082214 A1 | 3/2018 | Kobayashi et al. |
| 2018/0260662 A1 | 9/2018 | Clayton et al. |
| 2018/0300653 A1* | 10/2018 | Srinivasan ............ H04L 67/322 |
| 2018/0314971 A1 | 11/2018 | Chen et al. |
| 2018/0349189 A1* | 12/2018 | Rossi ........................ G06N 3/02 |
| 2018/0365019 A1* | 12/2018 | Rossi .................. G06F 16/2471 |
| 2019/0180082 A1 | 6/2019 | Moravec et al. |
| 2019/0205667 A1* | 7/2019 | Avidan ..................... G06N 3/08 |
| 2019/0250919 A1* | 8/2019 | Ben Chehida ........ G06F 9/4881 |
| 2019/0258511 A1* | 8/2019 | Aviely .................. G06F 9/4881 |
| 2019/0294923 A1 | 9/2019 | Riley et al. |
| 2019/0302259 A1 | 10/2019 | Van Fleet et al. |
| 2019/0310888 A1 | 10/2019 | Lessin et al. |
| 2019/0318099 A1 | 10/2019 | Carvalho et al. |
| 2019/0318201 A1 | 10/2019 | Ahmed et al. |
| 2020/0050965 A1 | 2/2020 | Harvill et al. |
| 2020/0057831 A1 | 2/2020 | Wu et al. |
| 2020/0074211 A1 | 3/2020 | Georgis |
| 2020/0089999 A1 | 3/2020 | Zargahi |
| 2020/0090000 A1 | 3/2020 | Zargahi |
| 2020/0090001 A1 | 3/2020 | Zargahi et al. |

OTHER PUBLICATIONS

Kaleem, et al., "Adaptive Heterogeneous Scheduling for Integrated GPUs", In Proceedings of the 23rd international Conference on Parallel Architectures and Compilation Techniques, Aug. 24, 2014, pp. 151-162.

Kim, et al., "Exploration of Supervised Machine Learning Techniques for Runtime Selection of CPU vs. GPU Execution in Java Programs", In Proceedings of the International Workshop on Accelerator Programming Using Directives, Jan. 31, 2018, pp. 125-144.

Park, et al., "Adaptive Scheduling on Heterogeneous Systems using Support Vector Machine", In Journal of Computing, vol. 99, Issue 4, Sep. 13, 2016, pp. 405-425.

"International Search Report and Written Opinion Issued in PCT Application No. PCT/US2019/039655", dated Sep. 20, 2019, 13 Pages.

Zhang, et al., "Monitoring-Based Task Scheduling in Large-Scale SaaS Cloud", In Proceedings of the International Conference on Service-Oriented Computing, Sep. 20, 2016, pp. 140-156.

"International Search Report and Written Opinion Issued In PCT Application No. PCT/US19/039653", dated Oct. 11, 2019, 14 Pages.

"International Search Report and Written Opinion Issued In PCT Application No. PCT/US19/039662", dated Oct. 11, 2019, 11 Pages.

"International Search Report and Written Opinion Issued In PCT Application No. PCT/US19/039666", dated Oct. 17, 2019, 12 Pages.

"Non Final Office Action Issued In U.S. Appl. No. 16/206,723", dated Aug. 7, 2020, 18 Pages.

"Final Office Action Issued In U.S. Appl. No. 16/206,723", dated Mar. 23, 2021, 20 Pages.

"Non Final Office Action Issued in U.S. Appl. No. 16/206,723", dated Jul. 12, 2021, 24 Pages.

"Non Final Office Action Issued in U.S. Appl. No. 16/206,695", dated Jun. 2, 2022, 15 Pages.

"Non Final Office Action Issued in U.S. Appl. No. 16/206,796", dated May 18, 2022, 10 Pages.

U.S. Appl. No. 16/206,796 | 2020-0090001-A1, filed Nov. 30, 2018 | Mar. 19, 2020.

U.S. Appl. No. 16/206,695 | 2020-0089999-A1, filed Nov. 30, 2018 | Mar. 19, 2020.

U.S. Appl. No. 16/206,732 | 2020-0089541-A1, filed Nov. 30, 2018 | Mar. 19, 2020.

U.S. Appl. No. 16/206,732 | 2020-0090000-A1, filed Nov. 30, 2018 | Mar. 19, 2020.

"Final Office Action issued in U.S. Appl. No. 16/206,723", dated Jan. 31, 2022, 31 Pages.

"Non Final Office Action Issued in U.S. Appl. No. 16/206,695", dated Oct. 20, 2022, 21 Pages.

"Notice of Allowance Issued in U.S. Appl. No. 16/206,796", dated Oct. 12, 2022, 5 Pages.

U.S. Appl. No. 62/732,949, filed Sep. 18, 2018.
US-2020-0090000-A1, filed Mar. 19, 2020.
US-2020-0090001-A1, filed Mar. 19, 2020.
US-2020-0089999-A1, filed Mar. 19, 2020.

* cited by examiner

FIG. 5

CLASSIFICATION OF SYNTHETIC DATA TASKS AND ORCHESTRATION OF RESOURCE ALLOCATION

CROSS REFERENCE TO RELATED APPLICATIONS

The present application is a continuation of U.S. Provisional Application No. 62/732,949 filed Sep. 18, 2018, the contents of which are hereby incorporated by reference in their entirety.

BACKGROUND

Users rely on different types of technological systems to accomplish tasks. Technological systems may be improved based on machine learning that uses statistical techniques to give computers the ability progressively improve performance of a specific task with data, without being explicitly programmed. For example, machine learning can be used for data security, personal security, fraud detection, healthcare, natural language processing, online searching and recommendations, financial trading and smart cars. For each of these fields or domains, machine learning models are trained with training datasets. Training datasets are example sets of data used to create the framework for matching learning tasks and machine learning applications. For example, facial recognition systems can be trained to compare the unique features of a person's face to a set of known features of faces to properly identify the person. With the ever-increasing use of machine learning in different fields, and the importance of properly training machine learning models, improvements to computing operations of a machine learning training system would provide more efficient performance of machine learning tasks and applications, and also improve user navigation of graphical user interfaces of machine learning training systems.

SUMMARY

Embodiments of the present invention relate to methods, systems, and computer storage media for providing a distributed computing system that supports synthetic data as a service. By way of background, distributed computing systems may operate based on service-oriented architecture, where services are provided using different service models. At a high level, a service model may offer abstraction from underlying operations associated with providing the corresponding service. Examples of service models include Infrastructure as a Service, Platform as a Service, Software as a Service, and Function as a Service. With any of these models, customers develop, run, and manage, aspects of the service, without having to maintain or develop operational features that are abstracted using the service-oriented architecture.

Turning to machine learning and training datasets, machine learning uses statistical techniques to give computers the ability progressively improve performance of a specific task with data, without being explicitly programmed. Training datasets are an integral part of the field of machine learning. High-quality datasets can help improve machine learning algorithms and computing operations associated with machine learning hardware and software. Creating a high-quality training dataset may take a significant amount of effort. For example, labeling data for a training dataset can be particularly tedious which often leads to inaccuracies in the labeling process.

Conventional methods for finding training datasets fall significantly short when it comes to democratizing training datasets or, in other words, making training datasets universally available for use across several different domains. For example, limited training dataset generation resources, competition between machine learning system providers, confidentiality, security, and privacy considerations, among other factors, may limit how many training datasets can be generated or shared, and also limit the different domains in which training datasets are available. Moreover, theoretical solutions for developing machine learning training datasets simply have not been fully defined, enabled, or described because the infrastructure for implementing such solutions is inaccessible or far too expensive to undertake in order to realize alternatives to current techniques for developing training datasets. Overall, comprehensive functionality and resources for developing machine learning training datasets are limited in conventional machine learning training services.

Embodiments described in the present disclosure are directed towards technologies for improving access to machine learning training datasets using a distributed computing system that provides synthetic data as a service ("SDaaS"). SDaaS may refer to a distributed (cloud) computing system service that is implemented using a service-oriented architecture. The service-oriented architecture provides machine learning training services, while abstracting underlying operations that are managed via the SDaaS. For example, the SDaaS provides a machine learning training system that allows customers to configure, generate, access, manage, and process synthetic data training datasets for machine learning. In particular, the SDaaS operates without the complexity typically associated with manual development of training datasets. SDaaS can be delivered in a number ways based on SDaaS engines, managers, modules or components, which include an asset assembly engine, a scene assembly engine, a frameset assembly engine, a frameset package generator, a frameset package store, a management layer, a feedback loop engine, crowdsourcing engine, and a machine learning training service. The observable effect of implementing the SDaaS on a distributed computing system is the mass production and availability of synthetic data assets that support generating training datasets. In particular, training datasets are generated by altering intrinsic parameters and extrinsic parameters of synthetic data assets (e.g., 3D models) or scenes (e.g., 3D scenes and videos). In other words, training datasets are generated based on intrinsic-parameter variation (e.g., asset shape, position and material properties) and extrinsic-parameter variation (e.g., variation of environmental and/or scene parameters such as lighting, perspective), where intrinsic-parameter variation and extrinsic-parameter variation provide programmable machine learning data representations of assets, and scenes having a plurality of assets. Additional specific functionality is provided using components of the SDaaS as described in more detail below.

As such, the embodiments described herein improve computing functions and operations for generating training datasets based on providing synthetic data as a service using a distributed computing system. For example, the computing operations required for manual development (e.g., labeling and tagging) and refinement (e.g., updating) of training datasets is obviated based on SDaaS operations. SDaaS operations automatically develop training datasets using synthetic data assets and automatically refine training datasets based on training dataset reports indicating additional synthetic data assets or scenes that would improve a machine learning model in a machine learning training service. In this regard, the SDaaS addresses problems arising out of manual development of machine learning training datasets and improves on existing processes for training machine learning models in a distributed computing system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 5 depicts an example distributed computing system synthetic data as a service interface, in accordance with embodiments of the present invention;

DETAILED DESCRIPTION

Figure 1A:
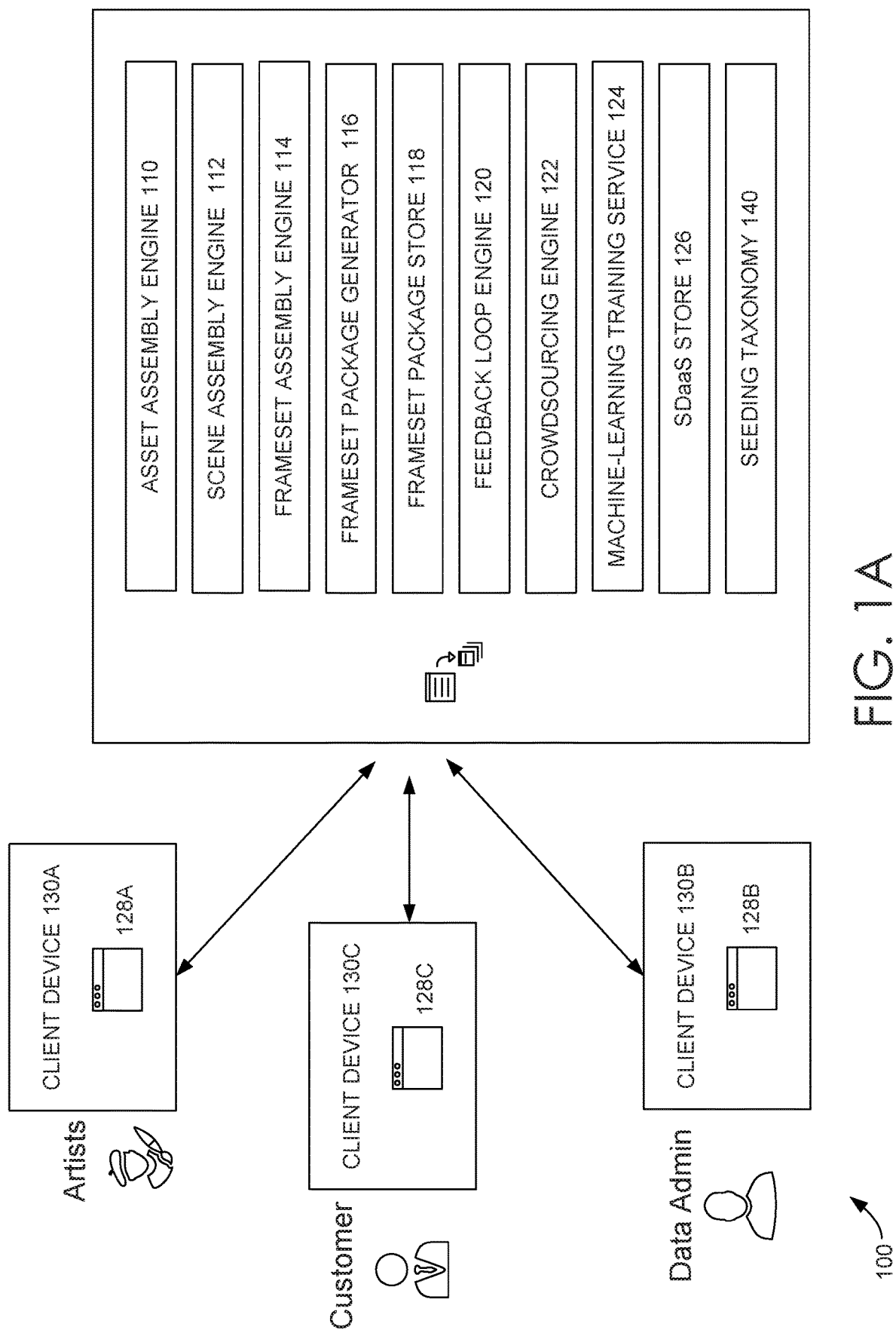
FIGS. 1A and 1B are block diagrams of an example distributed computing for providing synthetic data as a service, in accordance with embodiments of the present invention.

Distributed computing systems can be leveraged to provide different types of service-oriented models. By way of background, a service model may offer abstraction from underlying operations associated with providing the corresponding service. Examples of service models include Infrastructure as a Service, Platform as a Service, Software as a Service, and Function as a Service. With any of these models, customers develop, run, manage, aspects of the service without having to maintain or develop operational features that are abstracted using the service-oriented architecture.

Machine learning that uses statistical techniques give computers the ability to progressively improve performance of a specific task with data, without being explicitly programmed. For example, machine learning can be used for data security, personal security, fraud detection, healthcare, natural language processing, online searching and recommendations, financial trading, and smart cars. For each of these fields or domains, machine learning models are trained with training datasets that are example sets of data used to create the framework for matching learning tasks and machine learning applications. Training datasets are an integral part of the field of machine learning. High-quality datasets can help improve machine learning algorithms and computing operations associated with machine learning hardware and software. Machine learning platforms operate based on training datasets that support supervised and semi-supervised machine learning algorithms; however high-quality training datasets are usually difficult and expensive to produce because the large amount of time needed to label the data. Machine learning models depend on high-quality labeled training dataset for supervised learning such that the model can provide reliable results in predictions, classification, and analysis of different types of phenomena. Without the right type of training dataset, developing a reliable machine learning model may be impossible. A training dataset includes labeled, tagged, and annotated entries to train the machine learning algorithm effectively.

Conventional methods for finding training datasets fall significantly short when it comes to democratizing or, in other words, making training datasets universally available for use across several different domains. Currently, such limited solutions include outsourcing the labeling functions, repurposing existing training data and labels, harvesting your own training data and labels from free sources, relying on third-party models that have been pre-trained on labeled data, and leveraging crowdsourcing labeling services. Most of these solutions are either time consuming, expensive, inappropriate for sensitive projects, or plainly not robust enough to tackle large scale machine learning projects. Moreover, theoretical solutions for developing machine learning training datasets simply have not been fully defined, enabled, or described because the infrastructure for implementing such solutions is inaccessible or far too expensive to undertake to realize alternatives to current techniques for developing training datasets. Overall, comprehensive functionality around developing machine learning training datasets is limited in conventional machine learning training services.

Embodiments described herein provide simple and efficient methods and systems for implementing a distributed computing system that provides synthetic data as service ("SDaaS"). SDaaS may refer to a distributed (cloud) computing system service that is implemented using a service-oriented architecture to provide machine learning training services while abstracting underlying operations that are managed via the SDaaS service. For example, the SDaaS provides a machine learning training system that allows customers to configure, generate, access, manage, and process synthetic data training datasets for machine learning. In particular, the SDaaS operates without the complexity typically associated with manual development of training datasets. SDaaS can be delivered in a number ways based on SDaaS engines, managers, modules, or components, which include an asset assembly engine, a scene assembly engine, a frameset assembly engine, a frameset package generator, a frameset package store, a management layer, a feedback loop engine, a crowdsourcing engine, and a machine learning training service. The observable effect of implementing the SDaaS as a service on a distributed computing system is the mass production and availability of synthetic data assets that support generating training datasets. In particular, training datasets are generated by altering intrinsic parameters and extrinsic parameters of synthetic data assets (e.g., 3D models) or scenes (e.g., 3D scenes and videos). In other words, training datasets are generated based on intrinsic-parameter variation (e.g., asset shape, position and material properties) and extrinsic-parameter variation (e.g., variation of environmental and/or scene parameters such as lighting, perspective), where intrinsic-parameter variation and extrinsic-parameter variation provide programmable machine learning data representations of assets, and scenes having a plurality of assets. Additional specific functionality is provided using components of the SDaaS as described in more detail below.

By way of background, advancements in computer technology and computer graphics support the generation of virtual environments. For example, graphics processing units (GPUs) can be used for manipulating computer graphics (e.g., 3D objects) and image processing. Virtual environments can be generated using computer graphics to create realistic depictions to the real world. Virtual environments may be wholly made up of computer graphics, or partially, having a combination of computer graphics and real world objects. Partial virtual environments are sometimes referred to as augmented reality virtual environments. By way of example, in order to generate a virtual environment, a 3D scanner may be used to scan a real world environment, and objects in the real world environment are programmatically identified and given attributes or properties. For example, a room may be scanned and the walls of the room identified along with a table in the room, and the wall and table can be assigned attributes such as color, texture, and dimensions. Other different types of environments and objects can be scanned, mapped to attributes, and used to realistically render virtual representations of the real world environments and objects. Conventionally, images may be captured using video cameras and other image capture devices, while virtual environments are generated using different types of computer graphics processes. Conventionally captured images may be used for training machine learning models, and virtual images may be used to train machine learning models. Conventionally captured images may be referred to as non-synthetic data, while virtual images may be referred to as synthetic data.

Synthetic data has several advantages over non-synthetic data. In particular, synthetic data can be used to improve machine learning (i.e., programming computers to learn how to perform and progressively improve performance of a specific task) because of the inherent properties of synthetic data that are missing from non-synthetic data. At a high level, the programmatic structure of synthetic data allows for training datasets to be generated based on intrinsic-parameter variation and extrinsic-parameter variation, where intrinsic-parameter variation and extrinsic-parameter variation provide programmable machine learning data representations of assets and scenes having a plurality of assets. By way of example, synthetic data can include, or be generated based on, assets that can be manipulated to produce different variations (e.g., asset, scene, and frameset variations) of the same virtual environment. Non-synthetic data (e.g., a video recording and images) that is used for training a machine learning model about a particular object, feature, or environment is static and generally unalterable, in contrast to virtual assets where intrinsic and extrinsic parameters, as described herein, can be altered. The ability to create variations of virtual environments (i.e., assets, scenes, and framesets) allows for the generation of infinite combinations of training datasets which can be used for machine learning. It is contemplated that the present invention may obviate or limit the amount of manual intervention needed to provide privacy and security in training datasets. For example, conventional training datasets may include personal identification information, people's faces, or locations that have to be manually redacted for privacy of security purposes. With synthetic data, training datasets can be generated without any privacy or security implications and/or generated to remove or redact privacy or security related information, while retaining the capacity to alter intrinsic and extrinsic parameters of the asset.

Synthetic data can have several applications, by virtue of the programmable structure described above, that can solve problems faced in machine learning, especially with regard to acquiring training datasets. As discussed, acquiring training datasets can be difficult for several reasons. One specific example is the difficulty in correctly labeling synthetic data. A machine learning model for facial recognition may be trained using a training dataset that has been manually labeled, which introduces human error. For example, an image frame that includes person's face may be processed with a bounding box around the person's face; however the accuracy and properties associated with the bounding box are open to human interpretation, and mistakes can be made that impact the training dataset and ultimately the machine learning model generated from the training dataset. Synthetic data can be used to improve the labeling process and remove human error associated with the labeling process. In another example, in order to train a machine learning model to understand and make deductions about car collisions at an intersection, the machine learning model would have to include a training dataset representing car collisions. The problem here is that a finite number of images of car collisions exist, and even less images of collisions exist at the particular intersection of interest. Moreover, the devices, context, and scenarios that are used for capturing introduce specific limitations and challenges in the machine learning training process that cannot be overcome when relying on conventional training dataset development methods. For example, artifacts from a recording device may bias the picture quality and the machine learning model that is developed from a training dataset if those artifacts cannot be removed or programmed into the machine learning training process and model.

Accordingly, the programmatic structure of assets that define, or are used to generate, synthetic data can be used to improve the fundamental elements of machine learning training itself. The rules, data structures, and processes used for machine learning are conventionally associated with non-synthetic data. As such, machine learning training can be retooled to incorporate aspects of synthetic data which are otherwise missing in non-synthetic data. In particular, machine learning training can include rules, data structures, and processes for managing the different variations of assets in a manner that improves machine learning training and the resulting machine learning model. Synthetic data assets, scenes, and framesets can be assembled and managed, and frameset packages generated and accessed through SDaaS operations and interfaces. Also, machine learning models can be trained and refined with synthetic data only or a combination of synthetic data and non-synthetic data, in a hybrid machine learning model. Machine learning training may be done in defined phases and durations that take advantage of aspects of synthetic data and non-synthetic data. Other variations and combinations of SDaaS operations based on synthetic data are contemplated with embodiments of the present invention.

In one embodiment, a source asset may include several different parameters that may be computationally determined based on known techniques in the art. By way of example, a source asset may refer to a three-dimensional representation of geometric data (e.g., a 3D model). The source asset may be expressed as a mesh made of triangles, where the smoother the triangles and the more detailed the surface of the model, the bigger the size of the source. A source asset is accessed and processed for use as a synthetic data asset. In this regard, a source asset can be represented across a spectrum from a high polygon model with lots of detail to a low polygon model with less detail. The process of representing a source asset in varying levels of detail may be referred to as decimation. A low polygon model can be used in different types of processes that would otherwise be computationally expensive for a high model. An automated decimation process may be implemented to store a source asset in different levels of detail. Other types of programmable parameters may be determined and associated with a source asset that is stored as a synthetic data asset.

Embodiments of the present invention may operate on a two-tier programmable parameter system where a machine learning training service may automatically, or based on manual intervention or input, train a model based on accessing and determining first-tier parameters (e.g., asset parameters) and/or a second tier parameters (e.g., scene parameters or frameset parameters), and use the parameters to improve a training dataset and, by extension, improve the process of machine learning training and the machine learning training model itself. A machine learning training service may support deep learning and a deep learning network and other types of machine learning algorithms and networks. The machine learning training service may also implement a generative adversarial network as a type of unsupervised machine learning. The SDaaS may leverage these underlying tiered parameters in different ways. For example, the tiered parameters may be used to determine how much to charge for framesets, how to develop different types of framesets for specific devices (e.g., knowing the device parameters and being able to manipulate the parameters to develop training datasets), and the like.

Datasets used to train machine learning models are generally tailored to a particular machine learning scenario. To accomplish this tailoring, particular attributes of a scene (scene-variation parameters) and/or an asset within a scene (asset-variation parameters) can be selected and varied to generate different framesets (e.g., rendered images based on a 3D scene) for a frameset package. The number of potential variation parameters is theoretically unlimited. However, not all parameters can be varied to produce a frameset package that will improve the accuracy of a machine learning model for a given scenario. For example, a user may generate a synthetic data scene (e.g., a 3D scene) that includes an environment (e.g., a piece of land) and various 3D assets (e.g., a car, a person, and a tree). In some machine learning scenarios such as facial recognition, variation parameters such as human body shape, latitude, longitude, angle of the sun, time of day, camera perspective, and camera position may be relevant for improving the accuracy of a corresponding machine learning model. In other scenarios such as using computer vision and optical character recognition (OCR) to read health insurance cards, some of these variation parameters are not relevant. More specifically, variation parameters such as latitude, longitude, angle of the sun, and time of day may not be relevant for an OCR-based scenario, while other parameters such as camera perspective, camera position, and A to Z variability may be. As used herein, A to Z variability refers to differences in the manner in which different handwriting, fonts, and the like represent a particular letter. Generally, some variation parameters will be relevant to some scenarios, but not others.

Furthermore, not all users (e.g., customers, data scientists, etc.) will know which variation parameters are likely to be relevant to a particular scenario, and may select ineffective variation parameters. In such a situation, generating a corresponding frameset package would result in a substantial expenditure of unnecessary computing resources. Even when users can accurately select relevant variation parameters, when the number of possible variation parameters is large, the process of selecting a relevant subset can be time consuming and error-prone.

As such, in some embodiments, suggested variation parameters for a particular scenario can be presented to facilitate generating a frameset package. Relevant variation parameters can be designated by a seeding taxonomy that associates machine learning scenarios with a relevant subset of variation parameters. Generally, a user interface can be provided that facilitates scene generation and/or frameset generation. Upon identification of a particular machine learning scenario, the subset of variation parameters associated with the scenario in the seeding taxonomy can be accessed and presented as suggested variation parameters. The seeding taxonomy can be predetermined and/or adaptable. An adaptable seeding taxonomy may be implemented using a feedback loop that tracks selected variation parameters and updates the seeding taxonomy based on a determination that selected variation parameters for a frameset generation request differ from the suggested variation parameters in the seeding taxonomy. As such, the presentation of suggested variation parameters assists users to identify and select relevant variation parameters faster and more efficiently. In some cases, the presentation of suggested variation parameters prevents the selection of ineffective variation parameters and the concomitant expenditure of unnecessary computing resources.

In some embodiments, a seeding taxonomy can be maintained that maps machine learning scenarios to relevant variation parameters for the scenarios. For example, the seeding taxonomy can include a list of machine learning scenarios (e.g., OCR, facial recognition, video surveillance, spam detection, product recommendations, marketing personalization, fraud detection, data security, physical security screenings, financial trading, computer assisted diagnosis, online search, natural language processing, smart car controls, Internet of Things controls, and others). Generally, a particular machine learning scenario may be associated with a relevant set of variation parameters (e.g., asset-variation parameters, scene-variation parameters, etc.) that can be varied to produce a frameset package that can be used to train and improve a corresponding machine learning model for the scenario. The seeding taxonomy can associate each scenario with a relevant subset of the variation parameters. For example, the variation parameters for all scenarios may be assigned a unique identifier, and the seeding taxonomy can maintain lists of unique identifiers indicating relevant variation parameters for each scenario.

The user interface that facilitates scene generation and/or frameset generation can facilitate an identification of a desired machine learning scenario (e.g., based on a user input indicating a desired scenario). A list or other indication of the subset of variation parameters associated with the identified scenario in the seeding taxonomy can be accessed and presented as suggested variation parameters via the user interface. For example, the user interface may include a form that accepts an input indicting one or more machine learning scenarios. The input can be via a text box, drop down menu, radio button, checkbox, interactive list, or other suitable input. The input indicting a machine learning scenario can trigger a lookup and presentation of relevant variation parameters maintained in the seeding taxonomy. The relevant variation parameters can be presented as a list or other indication of suggested variation parameters for a selected machine learning scenario. The user interface can accept an input indicating a selection of one or more of the suggested variation parameters and/or one or more additional variation parameters. As with the input indicating a machine learning scenario, the input indicating selected variation parameters can be via a text box, drop down menu, radio button, checkbox, interactive list, or other suitable input. The input indicting selected variation parameters can cause a frameset package to be generated using the selected variation parameters, and the frameset package can be made available, for example, by download or otherwise.

Generally, the seeding taxonomy can be predetermined and/or adaptable. For example, in embodiments which include an adaptable seeding taxonomy, a feedback loop may be implemented that tracks selected variation parameters for each machine learning scenario. The feedback loop can update the seeding taxonomy based on a comparison of selected variation parameters for a particular frameset package to suggested variation parameters for a corresponding machine learning scenario. A variation parameter can be added or removed from the list or other indication of associated variation parameters for a particular scenario in the seeding taxonomy in various ways. For example, a variation parameter can be added or removed based on a determination that selected variation parameters for a particular frameset generation request differ from the suggested variation parameters in the seeding taxonomy for a corresponding machine learning scenario. This update to the seeding taxonomy can be performed based on a determined difference for a single request, for a threshold number of requests, a majority of requests, or other suitable criteria. As such, in these embodiments, the seeding taxonomy is evolving and self-healing.

As explained above, datasets used to train machine learning models are generally tailored to a particular machine learning scenario. Further, some scenarios may recur, particularly in (Artificial Intelligence) AI-heavy industries such as government, health care, retail, oil and gas, gaming, and finance. However, recreating a synthetic dataset for a particular machine learning scenario each time the dataset is requested would result in a substantial expenditure of computing resources.

As such, in some embodiments, synthetic datasets (e.g., frameset packages) for common or anticipated machine learning scenarios can be pre-packaged by creating the dataset before a customer or other user requests the dataset. A user interface can be provided that includes a form or other suitable tool that allows the user to specify a desired scenario. For example, a form may allow the user to specify an industry sector and a particular scenario within the industry sector. In response, a representation of available packages of synthetic data for that industry sector and scenario may be presented, the user may select an available package, and the selected package may be made available, for example, by download or otherwise. By pre-packaging synthetic datasets such as these, the substantial expenditure of computing resources that would otherwise be required to generate the datasets on demand and multiple times can be avoided.

One example of a common machine learning scenario may occur in the government sector. For example, an agency may desire to use computer vision and optical character recognition (OCR) to read health insurance cards for veterans. If the agency needs to read 1000 cards per day, but a current model has a 75% accuracy, the current model fails to properly read 250 cards per day. In order to increase the accuracy of the model (e.g., to 85%), the agency may desire a dataset that can be used to train the model to increase its accuracy. In some embodiments, a representative can use techniques described herein to create a synthetic dataset for improving OCR. In other embodiments, however, the dataset may be pre-packaged and made available on demand.

In some embodiments, a list or other indication of pre-packaged synthetic datasets can be presented via a user interface that facilitates scene generation and/or frameset generation. For example, the user interface can present a form that accepts an input indicating one or more industry sectors. The input can be via a text box, drop down menu, radio button, checkbox, interactive list, or other suitable input. The input indicating an industry sector can trigger a presentation of a list or other indication of pre-packaged synthetic datasets for the selected industry sector(s). The user interface can accept an input indicating a selection of one or more of the pre-packaged synthetic datasets. As with the input indicating an industry sector, the input indicating a pre-packaged synthetic dataset can be via a text box, drop down menu, radio button, checkbox, interactive list, or other suitable input. The input indicating a pre-packaged synthetic dataset can cause the selected pre-packaged synthetic dataset to be made available, for example, by download or otherwise.

Different types of processors may be better at performing different tasks associated with embodiments of the present invention. For example, CPUs are often optimized to perform serial processing of a variety of different tasks, while GPUs are optimized to perform parallel processing of heavy computing tasks for applications such as 3D visualization, gaming, image processing, big data, deep machine learning, and the like. Since the process of creating synthetic data assets can be visually intensive, the use of GPUs can expedite the process and increase computing efficiency. However, GPUs may have limited availability for various reasons, including use for other tasks, cost constraints, or otherwise. Thus, CPUs may additionally or alternatively be used. As such, techniques are needed to orchestrate the allocation of resources to process synthetic data tasks.

In some embodiments, a management layer can be used to classify synthetic data tasks and can orchestrate the allocation of resources such as processors or groups of processors (e.g., CPUs and GPUs) to process the tasks. Generally, the management layer can assign a request to perform a synthetic data task for execution on a CPU or GPU based on a classification of the task and/or resource availability. In some embodiments, the management layer can accomplish this by classifying incoming tasks by task category and/or eligible resource for processing the task, queuing the classified tasks, and routing or otherwise assigning the queued tasks to a corresponding processor based on task classification, resource availability, or some other criteria.

For example, when the management layer receives a request to perform a synthetic data task, the management layer can classify the task by task category. The categories of tasks that support synthetic data creation can include generation or specification of source assets (e.g., 3D models), ingestion of source assets, simulation (e.g., identification and variation of first-tier and/or second-tier parameters), synthetic data creation (e.g., rendering images based on 3D models), some sub-category thereof, or otherwise. Some tasks may be GPU-favored, such as simulation. Other tasks may be CPU-favored, such as variation or ingestion. For example, ingestion can include a significant amount of idle activity, so it may be desirable to process ingestion tasks on a CPU to avoid idling a GPU. Meanwhile, some tasks may not favor a CPU or a GPU. As such, some tasks such as these can be classified in terms of an eligible resource for processing the task (e.g., CPU-only, GPU-only, hybrid, etc.), and the classification may be based on task category. Classified tasks may be queued for processing (e.g., in a single queue, separate queues for each classification, or otherwise).

Generally, the management layer can monitor the availability of resources (e.g., CPUs and GPUs) and route or otherwise assign tasks to a resource using a variety of techniques. For example, tasks can be assigned based on task classification, queuing (e.g., FIFO, LIFO, etc.), a prioritization scheme (e.g., giving priority to a particular account or queue), scheduling (e.g., changing the assignment depending on time of day, week, year, etc.), resource availability, some other criteria, or some combination thereof. Generally, tasks classified for processing on a CPU are assigned to a CPU, tasks classified for processing on a GPU are assigned to a GPU, and hybrid tasks can be assigned to either (e.g., based on resource availability, giving priority to an available GPU, etc.).

In some situations, computing efficiency can be increased by keeping GPUs loaded. As such, the management layer can monitor one or more GPUs to determine when a GPU is available (e.g., when a GPU enters a stand-by or pending mode), and the management layer can route or otherwise assign a task (e.g., a classified and/or queued task) to the available GPU for execution. For example, an available GPU can be assigned to process a particular queued task selected based on an eligible resource for processing the task (e.g., giving priority to hybrid or GPU-only tasks), based on task category (e.g., giving priority to requests to create synthetic data), based on the time a request was received (e.g., giving priority to an earliest queued task), based on queue population (e.g., giving priority to the most populated queue), based on an estimated time to completion (e.g., giving priority to the task estimated to take the longest or shortest time to execute), or otherwise. As such, tasks in synthetic data creation can be routed or otherwise assigned to a particular resource (e.g., processor) based on various criteria.

In some circumstances, creation of synthetic data can take a significant amount of time. For example, a client may submit a synthetic data request to create 50 k synthetic data assets (e.g., images) from a selected source asset (e.g., a 3D model). Processing a request of this magnitude may involve executing multiple tasks and can take on the order of hours. As such, a portal can be provided that allows a requesting account to actively monitor SDaaS progress in processing a request and/or to issue commands to assign a resource to process the tasks, even after beginning to process the request. For example, the portal may support commands to change or add resources (e.g., CPUs/GPUs), or otherwise coordinate a resource allocation on the fly (e.g., mid-request). By changing a resource allocation on the fly (e.g., by assigning creation of a batch of synthetic data to one or more GPUs), the portal can allow a user to reduce the time it takes to process a request (e.g., from 10 hours to 6 hours). As such, the portal can allow a client or other user to visualize characteristics of the progress and/or impact the manner of processing.

The portal can provide various types of feedback about the processing of a synthetic data request. Among other types of feedback, the portal may present an indication of the progress in processing a request (e.g., 20 k out of 50 k images created), CPU/GPU usage, average time spent for synthetic data creation on CPU, average time spent for synthetic data creation on GPU, estimated time left (e.g., based on an existing or estimated pattern of creation), a corresponding service cost (e.g., incurred, estimated or predicted for completion of processing a request, etc.), or other information. For example, the portal can present an indication of resource consumption or availability (e.g., availability within an existing service level agreement, resources available for an additional charge, etc.), and may be broken down by task classification. In another example, the portal can present information indicating which resource (s) is assigned to which request and/or task. In yet another example, the portal can present information indicating a quantity of resource consumption thus far (e.g., for billing purposes). These are merely examples, and other types of feedback are possible.

In some embodiments, the portal can execute a command to assign resources, and may support such commands even after a request has begun processing (mid-request). For example, a command to batch the creation of synthetic data assets (e.g., assets 20 k through 30 k from a request to create 50 k assets) can be executed, and a corresponding task can be allocated to a particular processor (e.g., a GPU). In this manner, a user can manually set or change a resource allocation on the fly. Similarly, a command to cancel processing a request (e.g., to create synthetic assets) can be executed. As such, a command interface can be provided to allow the SDaaS (e.g., via automatic control) and/or a user (e.g., via manual control, selection of a corresponding automatic control, etc.) to reduce and/or minimize processing time, cost (e.g., by assigning tasks to execute on a relatively cheaper processor such as a CPU), quality of output, or otherwise. Consuming a threshold amount of resources (and/or incurring a threshold cost) can trigger an automatic halt to further processing of requests, tasks, a particular classification thereof, or otherwise.

Embodiments of the present invention may support improving the machine learning training process inherently in that synthetic data itself may introduce new challenges and opportunities in machine learning training. By way of example, synthetic data introduces the possibility of infinite amount of training datasets. Storing the training datasets may be difficult as computing storage is a finite resource. Rendering the assets also requires computing resources. To address these problems, machine learning training with synthetic data can include rendering of assets in real-time without having to pre-render and store the assets. The machine learning model can be trained using on-the-fly generated synthetic data (e.g., assets, scenes, and framesets) to obviate storage of training datasets. In this regard, the process of machine learning training is changed to incorporate the capacity to handle real-time generation of training datasets, which conventionally was not required with non-synthetic data. Machine learning training can include real-time calls to APIs or services to generate relevant training datasets having identified parameters. Correspondingly, upon completion of training based on the real-time generated machine learning training synthetic data, the training dataset can be discarded. The mechanical process of reading gigabytes from storage is also obviated by not having to store pre-rendered synthetic data.

Further, by way of example, machine learning with synthetic data can be used to address the problem of machine learning bias. In particular, different machine learning models trained by different institutions have been observed to have attributes that depend on how the machine learning model is trained. The type of training data introduces bias in how the machine learning model operates. For example, a training dataset may have a high accuracy in recognizing white men and low accuracy in recognizing African American women because the training dataset lacked enough images of African American women to properly train the machine learning model. With synthetic data, assets of African American women can be generated and used in training the machine learning model to remove to the bias that would otherwise exist if the machine learning model was generated without adequate images of African American women. As such, the machine learning training process for an existing machine learning model may include identifying the deficiencies (e.g., classification confusion matrix for classification accuracy) with the machine training model and retraining the model based on generating synthetic image data that address the deficiencies to generate an updated machine learning training model that removes the bias of the machine learning model. In one example, the evaluation process for improving machine learning models may be standardized such that data scientists, through a machine learning training feedback interface, may access and review deficiencies in the training datasets. For example, training datasets may be tagged to assist identifying clusters, where clusters of asset parameters or scene parameters may be used to generate new training datasets to retrain a machine learning model. Retraining new training datasets may include identifying irrelevant parameters and dropping irrelevant parameters, identifying relevant parameters and adding the new relevant parameters based on analyzing metrics from machine learning model training results.

Machine learning models can also be generated and trained and retrained for specific scenarios. At a high level, a template machine learning model may be generated for a general problem; however the same template machine learning model may be retrained in several different ways using a variety of different training datasets to solve different specific scenarios or variations of the same problem. Template machine learning models address two challenges in machine learning training which cannot be addressed using non-synthetic data. Firstly, machine learning models may sometimes be tailored to the available training dataset, instead of the opposite, where the specific reason for generating the machine learning model dictates the training dataset to be generated. Secondly, machine learning training using only training datasets that are available results in inflexible machine learning models that are not easily repurposed without significant effort. In contrast, with synthetic assets, machine learning models dictate the type of training datasets that are generated for a template machine learning model or a specialized machine learning model that is generated based on the template machine learning model.

A template machine learning model may refer to a partially constructed or trained machine learning model that may be augmented with a supplemental training dataset to repurpose the machine learning model for different specialized scenarios. For example, a facial recognition model may be trained as a template, but then retrained to accommodate a particular camera, where the camera has known artifacts or specific positions or configurations which are introduced into the retraining dataset to specialize the retrained machine learning model for the particular camera. The supplemental training dataset can be specifically generated for the purpose of training the specialized machine learning model. The template-specialized machine learning training may include an interface for training templates, selecting specific retraining parameters for specialized training datasets, and training specialized machine learning models. Other variations and combination of template machine learning models and specialized machine learning models are contemplated with embodiments described herein.

Additionally, training datasets may be generated for specific hardware that is available for performing the machine learning training. For example, a first customer having access to GPU processors may request and have a synthetic data training dataset generated for ideal processing with GPU processors. A second customer having accessing CPU processors may request and have a synthetic data training dataset generated for the CPU processors. A third customer having access to both GPU and CPU processors or agnostic to GPU or CPU considerations may simply request and have a synthetic data training dataset generated accordingly. Currently, the training datasets dictate what processors may be used during the machine learning training process, while with synthetic data and also, in some specific scenarios, the combination of synthetic data and non-synthetic data can influence the type of synthetic data generated for machine learning. Synthetic data training data would correspond to the strengths or capacity of different types of processors to process the different types of training datasets for operations in machine learning model training.

Embodiments of the present invention further support different types of hybrid-based machine learning models. A machine learning model may be trained with non-synthetic data and then augmented by training with synthetic data to gap-fill non-synthetic data assets. Hybrid training may be iterative or in combination, in that the training may be performed completely with the non-synthetic data and then the synthetic data. In the alternative, the training may be performed with a combination of non-synthetic data and synthetic data at the same time. For example, and A to Z variability machine learning model may be trained with an existing training dataset and then augmented by training with synthetic data. However, it is possible to initially augment or gap-fill the training dataset prior to training the machine learning model. Another type of hybrid-based training may refer to training a machine learning model exclusively on synthetic data; however the hybrid machine learning model is compared to or built based on referencing a non-synthetic data machine learning model. In this regard, the final hybrid-based machine learning model is trained exclusively with synthetic data but benefits from previous machine learning model training results from an existing non-synthetic data machine learning model.

Synthetic data may further be used to generate complementary data for certain types of scenarios where one set of information is non-synthetic data associated with a first aspect of the scenario and the second set of data is synthetic data associated with a second aspect of the scenario. For example, a training dataset may have non-synthetic data for summer months, making the machine learning model precise for summer months but not for other months of the year. The same machine learning model can be trained for summer months with non-synthetic data while simultaneously being trained with synthetic data generated for the non-summer months. Further, with the synthetic data, there exists an infinite amount of training datasets that may be generated. As such, embodiments of the present invention may support an online training and offline training, where at a high level, online training refers to continuously training a machine learning model with new training datasets, and offline training may refer to only periodically training a machine learning model. It is contemplated that training may include periodically feeding the machine learning models with a combination of non-synthetic data and synthetic data.

Embodiments of the present invention may also use the extensive metadata that is associated with each asset, scene, frameset, or frameset package to improve the training of machine learning models. At a high level, the machine learning training process can be augmented and trained with the metadata associated with synthetic data. This addresses problems arising out of non-synthetic data that include limited or no metadata such that the machine learning model cannot benefit from additional details provided by metadata during the training process. By way of example, a picture of a collision at an intersection may show wet conditions, but does not further include specific indications of how long it has been raining, an exact quantification for visibility levels, or other parameters of the particular scene. Non-synthetic data is often limited to pixel level data with object boundaries. In contrast, synthetic data may include not only information about the above-identified parameters, but also any relevant parameters that can assist the machine learning model to correctly make predictions.

Moreover, the synthetic data parameters are accurately labeled, in contrast to human intervention in labeling non-synthetic data. The additional and accurate metadata improve accuracy in making predictions using the trained machine learning model. Also, as discussed above, the additional metadata support generating prediction machine learning models for specialized scenarios using the details from the additional metadata. The machine learning models trained with additional metadata can also support improved processing of queries for predictions using the machine learning models and also novel interfaces for making such queries. Queries may be based on the additional metadata that are available to train the machine learning models and corresponding results may be provided. It is contemplated that user interfaces for accessing, viewing, and interacting with the additional metadata for training, querying, and query results may be provided to users of the SDaaS system.

Example Operating Environment and Schematic Illustrations

Figure 1B:
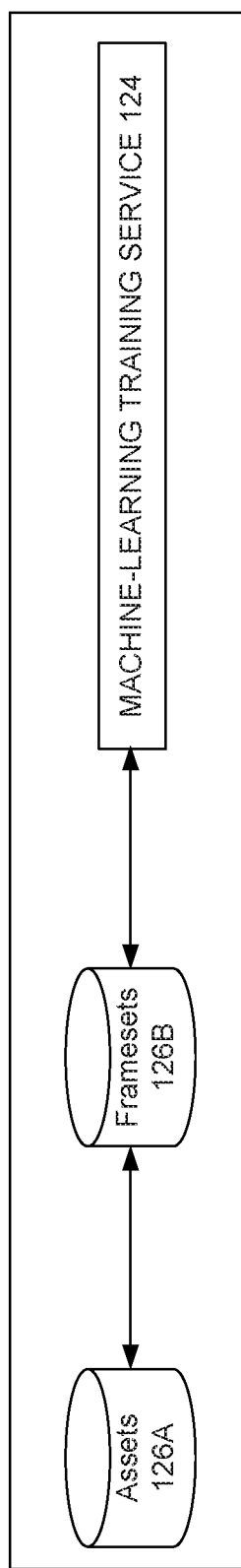

With reference to FIG. 1A and FIG. 1B, the components of the distributed computing system 100 may operate together to provide functionality for the SDaaS described herein. The distributed computing system 100 supports processing synthetic data assets for generating and processing training datasets for machine learning. At a high level, the distributed computing supports a distributed framework for mass production of training datasets. In particular, a distributed computing architecture built on features including file compression, GPU enabled hardware at scale, unstructured storage, and/or a distributed backbone network inherently supports the capacity to provide SDaaS functionality in a distributed manner such that a plurality of user (e.g., artists or data admins) may simultaneously access and operate on synthetic data assets.

FIG. 1A includes client device 130A and interface 128A, client device 130B and interface 128B, and client device 130C and interface 128C. The distributed computing system further includes several components that support the functionality of the SDaaS, the components including asset assembly engine 110, scene assembly engine 112, frameset assembly engine 114, frameset package generator 116, frameset package store 118, feedback loop engine 120, crowdsourcing engine 122, machine learning training service 124, SDaaS store 126, and seeding taxonomy 140. FIG. 1B illustrates assets 126A and framesets 126B stored in SDaaS store 126 and integrated with a machine learning training service for automated access to assets, scenes, and framesets as described in more detail below.

Figure 2A:
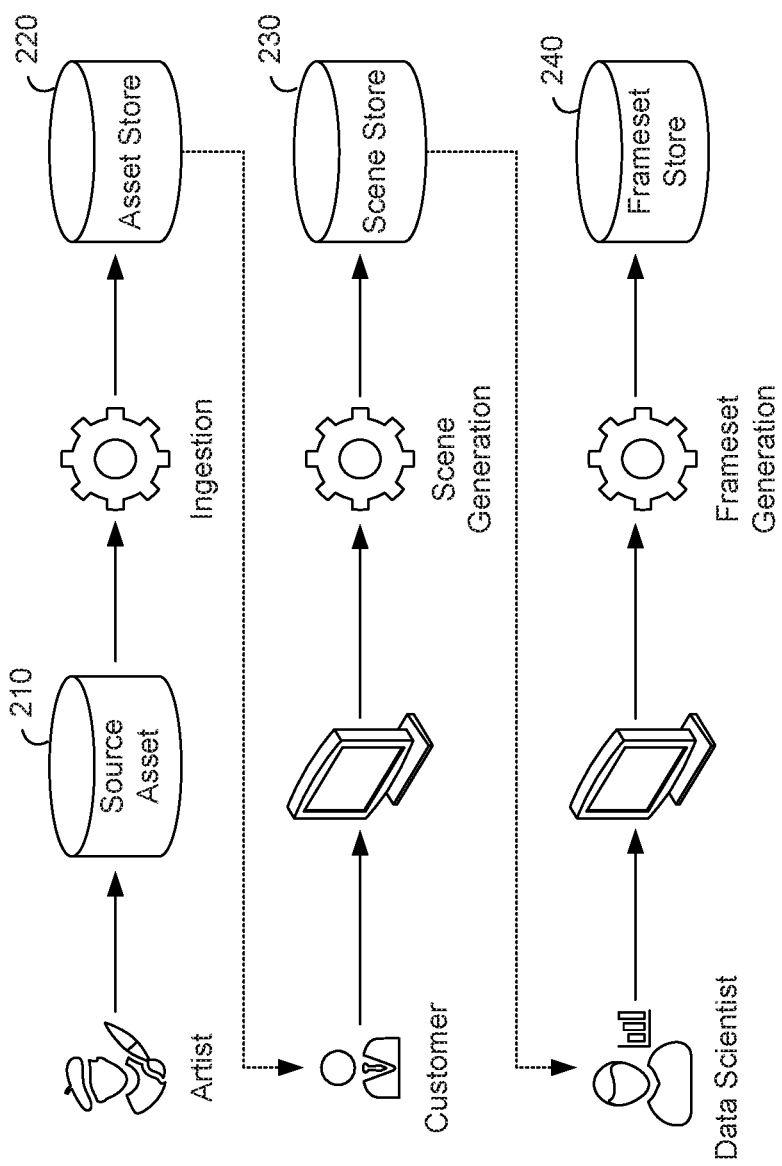
FIGS. 2A and 2B are flow diagrams illustrating an example implementation of a distributed computing system synthetic data as a service, in accordance with embodiments of the present invention.

The asset assembly engine 110 may be configured to receive a first source asset from a first distributed Synthetic Data as a Service (SDaaS) upload interface and may receive a second source asset from a second a distributed SDaaS upload interface. The first source asset and the second source asset may be ingested, where ingesting a source asset comprises automatically computing values for asset-variation parameters of the source asset. For example, FIG. 2A includes source asset 210 ingested into an asset store (i.e., asset 220). The asset-variation parameters are programmable for machine learning. The asset assembly engine may generate a first synthetic data asset comprising a first set of values for the asset-variation parameters, and may generate a second synthetic data asset comprising a second set of values for the asset-variation parameters. The first synthetic data asset and the second synthetic data asset are stored in a synthetic data asset store.

The distributed SDaaS upload interface (e.g., interface 128A, 128B, or 128C) is associated with an SDaaS integrated development environment (IDE). The SDaaS IDE supports identifying additional values for asset-variation parameters for source assets. The values are associated with generating training datasets based on intrinsic-parameter variation and extrinsic-parameter variation, where intrinsic-parameter variation and extrinsic-parameter variation provide programmable machine learning data representations of assets and scenes. Ingesting source assets is based on a machine learning synthetic data standard comprising a file format and a dataset-training architecture. File format may refer to hard standards while the dataset-training architecture may refer to soft standards, for example, automated or manual human intervention.

Figure 2B:
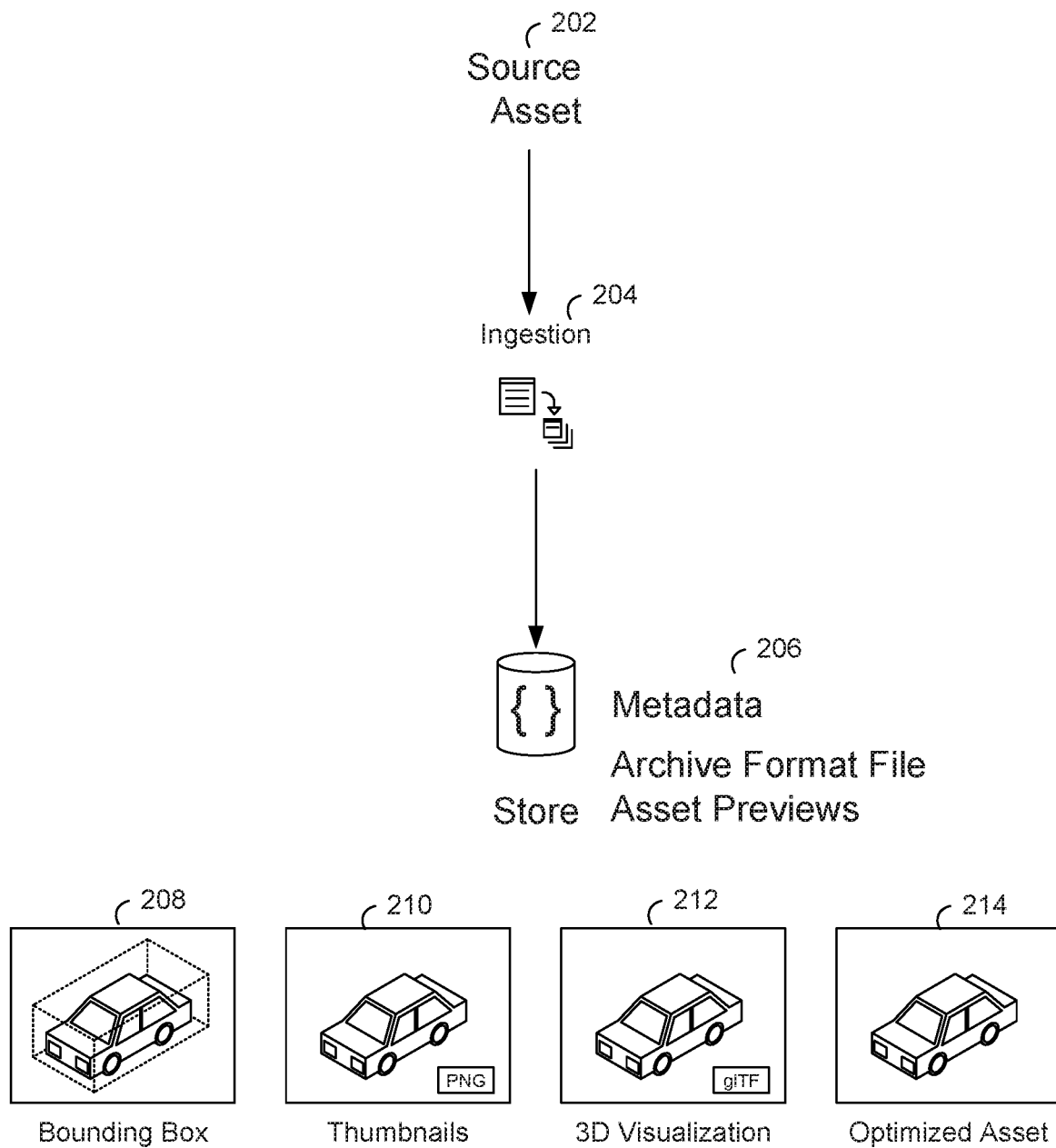
Figure 3:
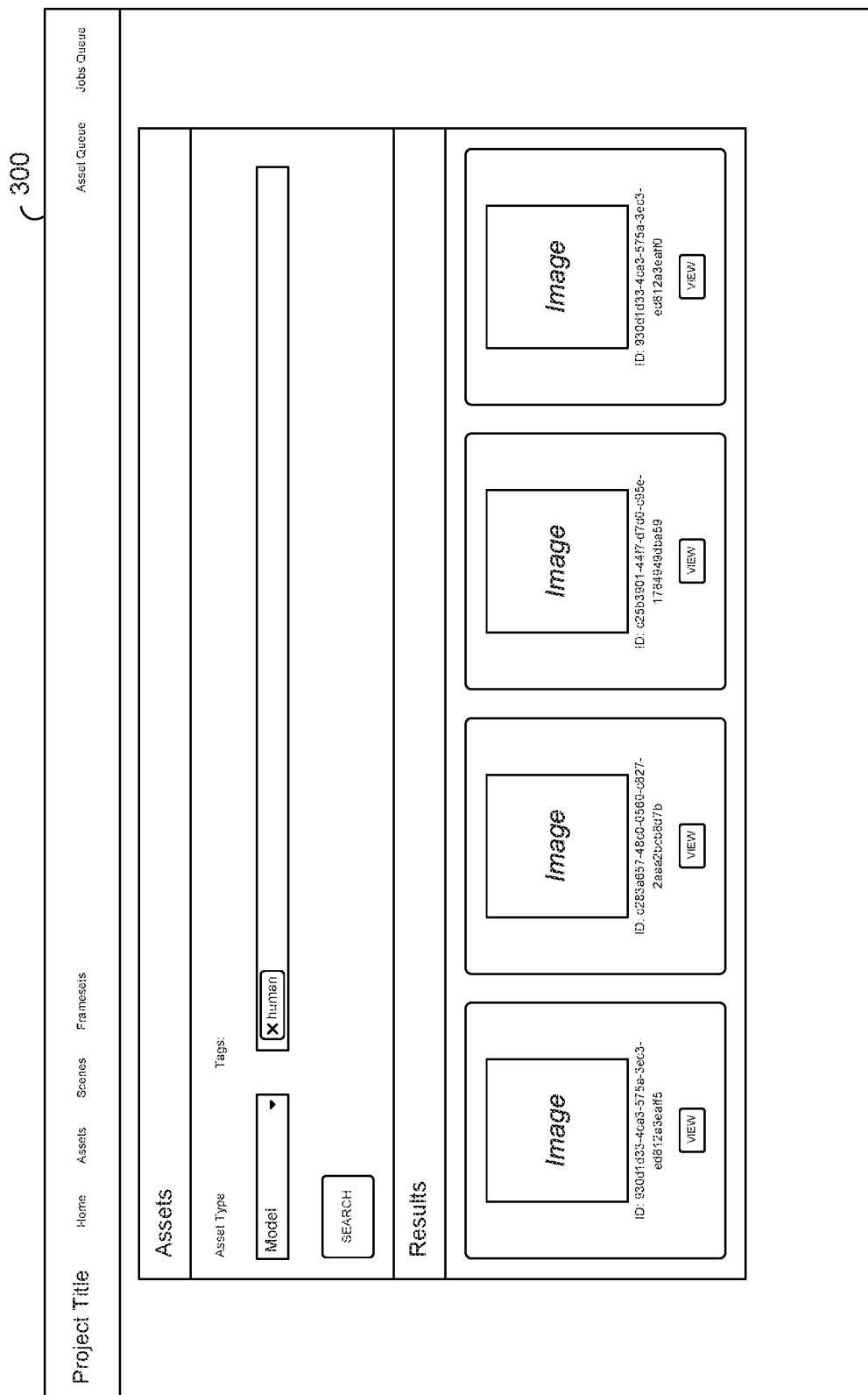
FIG. 3 depicts an example distributed computing system synthetic data as a service interface, in accordance with embodiments of the present invention.

With reference to FIG. 2, ingesting the source asset (e.g., source asset 202) further comprises automatically computing values for scene-variation parameters of the source asset, where the scene-variation parameters are programmable for machine learning. A synthetic data asset profile may be generated, where the synthetic data asset profile comprises the values of the asset-variation parameters. FIG. 2B illustrates additional artifacts such as bounding box 208, thumbnail 210, 3D visualization 212, and an optimized asset 214. With reference to FIG. 3, upload interface 300 is an example SDaaS interface that may support uploading and tagging source assets for ingestion.

Figure 4:
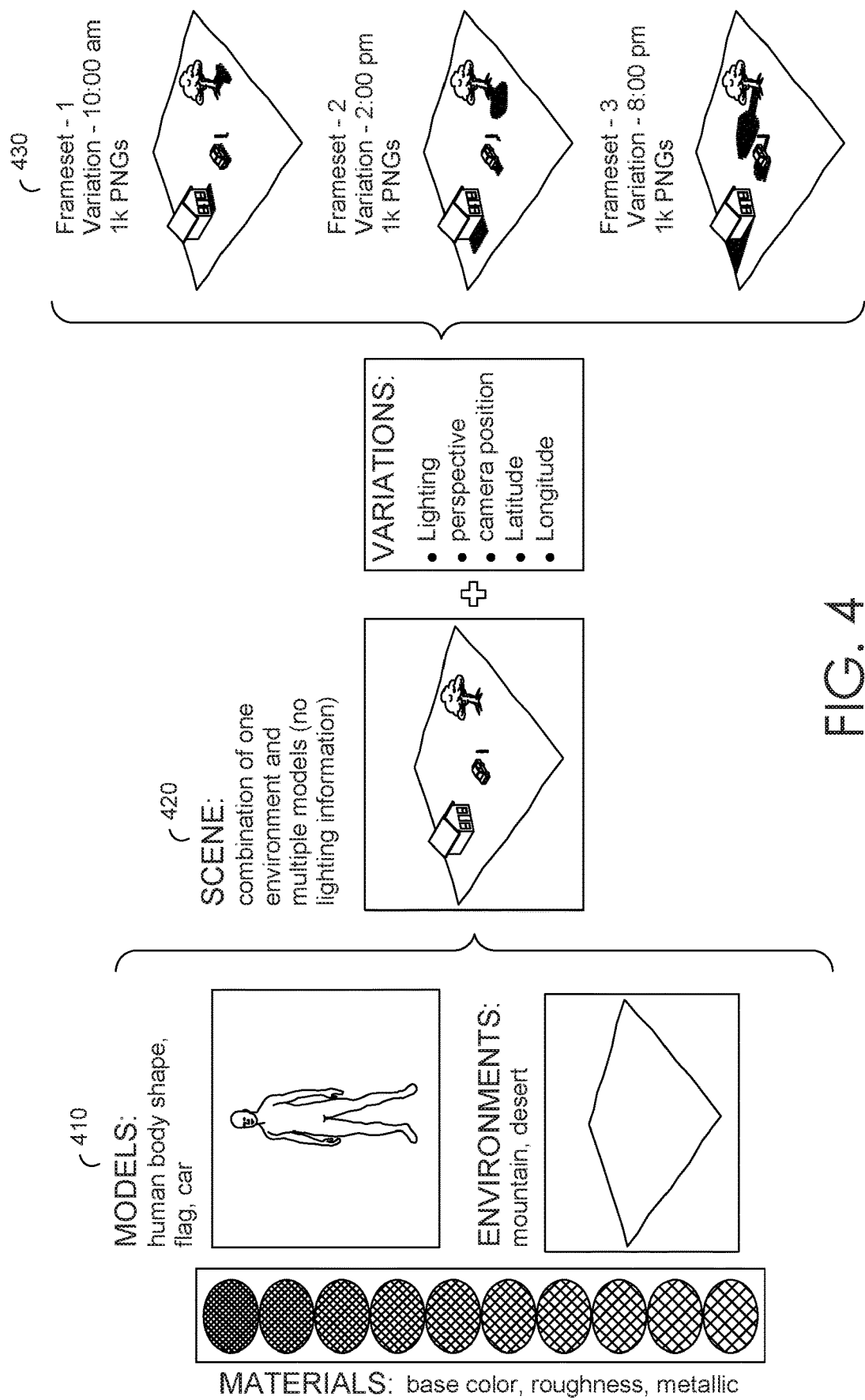
FIG. 4 depicts an example distributed computing system synthetic data as a service workflow, in accordance with embodiments of the present invention.

The scene assembly engine 112 may be configured to receive a selection of a first synthetic data asset and a selection of a second synthetic data asset (e.g., 3D models) from a distributed synthetic data as a service (SDaaS) integrated development environment (IDE). For example, with reference to FIG. 4, assets and asset-variation parameters 410 at a first tier may be used to generate a scene (e.g., a 3D scene) and scene-variation parameters 420 at a second tier, and are further used to define framesets 430 (e.g., images) from the scene. The synthetic data asset is associated with asset-variation parameters and scene-variation parameters that can be used to vary aspects of the synthetic data asset and/or the resulting scene. The asset-variation parameters and scene-variation parameters are programmable for machine learning. The scene assembly engine may receive values for generating a synthetic data scene, where the values correspond to asset-variation parameters or scene-variation parameters. Based on the values, the scene assembly engine may generate the synthetic data scene using the first synthetic data asset and the second synthetic data asset.

A scene assembly engine client (e.g., client device 130B) may be configured to receive a query for a synthetic data asset, wherein the query is received via the SDaaS IDE, generate a query result synthetic data asset, and cause display of a corresponding synthetic data scene generated based on the query result synthetic data asset. Generating the synthetic data scene may be based on values for scene generation received from at least two scene assembly engine clients. The synthetic data scene may be generated in association with a scene preview and metadata.

The frameset assembly engine 114 may be configured to access a synthetic data scene and determine a first set of values for scene-variation parameters, wherein the first set of values are automatically determined for generating a synthetic data scene frameset (e.g., a set of images generated based on variations of the scene). The frameset assembly engine may also generate the synthetic data scene frameset based on the first set of values, where the synthetic data scene frameset comprises at least a first frame in the frameset comprising the synthetic data scene updated based on a value for a scene-variation parameter; and store the synthetic data scene frameset. A second set of values for scene-variation parameters are manually selected for generating the synthetic data scene frameset. The second set of values are manually selected using a synthetic data as a service (SDaaS) integrated development environment (IDE) that supports a machine learning synthetic data standard comprising a file format and a dataset-training architecture. Generating the synthetic data scene frameset comprises iteratively generating frames for the synthetic data scene frameset based on updating the synthetic data scene based on the first set of values.

A frameset package generator 116 may be configured to access a frameset package generator profile, where the frameset package generator profile is associated with a first image generation device, where the frameset package generator profile comprises known device-variability parameters associated with the first image generation device. A frameset package is based on the frameset package generator profile, where the frameset package generator profile comprises values for the known device-variability parameters. The frameset package comprises a category that is based on at least two synthetic data scenes. Generating a frameset package is based on an anticipated machine learning algorithm that will be trained with the frameset package, where the anticipated machine learning algorithm is identified in the frameset package generator profile. The frameset package comprises assigning a value quantifier to the frameset package. The frameset package is generated based on a synthetic data scene comprising a synthetic data asset.

The frameset package store 118 may be configured to receive, from a frameset package query interface, a query for a frameset package, where the frameset query interface comprises a plurality of frameset package categories, identify a query result frameset package based on a frameset package profile; and communicate the query result frameset package. At least a portion of the query triggers an automatically suggested frameset package, where the automatically suggested frameset package is associated with a synthetic data scene of the frameset, the synthetic data scene having a synthetic data asset. The frameset package is associated with an image generation device, where the image generation device comprises known device-variability parameters that are programmable for machine learning. The query result frameset package is communicated to an internal machine learning model training service (e.g. machine-learning training service 124) operating on the distributed computing system or an external machine learning model training service.

The feedback loop engine 120 may be configured to access a training dataset report, wherein the training dataset report identifies a synthetic data asset having values for asset-variation parameters, where the synthetic data asset is associated with a frameset. The feedback loop engine 120 may be configured to update the synthetic data asset with a synthetic data asset variation parameter based on the training dataset report; and update the frameset using the updated synthetic data asset. The values are manually or automatically identified in the training dataset report for updating the frameset. Updating the frameset is assigned a value quantifier. The training dataset report is associated with an internal machine learning model training service operating on the distributed system or an external machine learning model training service.

Figure 5:
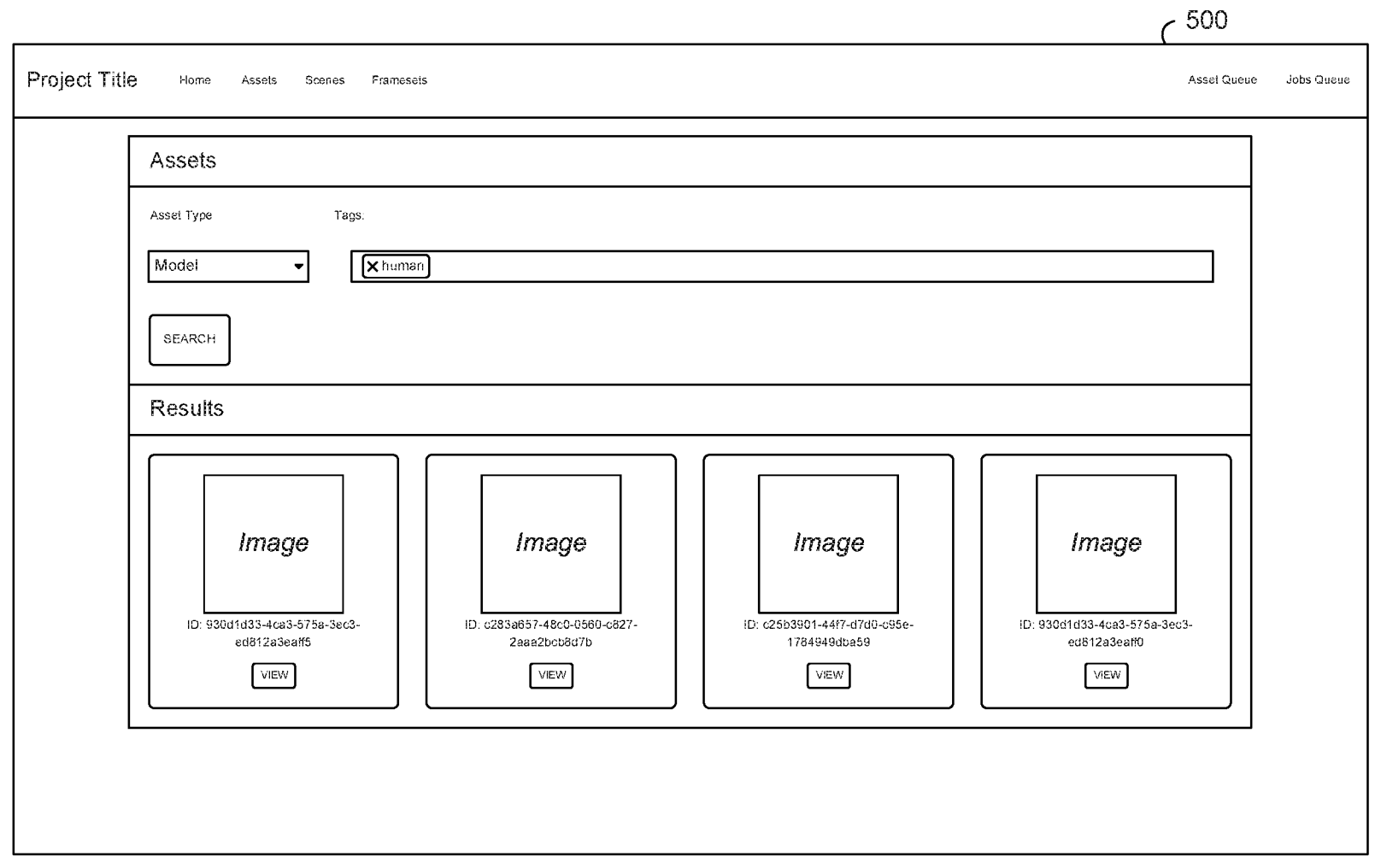

A crowdsourcing engine 122 may be configured to receive a source asset from a distributed synthetic data as a service (SDaaS) crowdsource interface; receive a crowdsource tag for the source asset via the distributed SDaaS crowdsource interface; based in part on the crowdsource tag, ingest the source asset, where ingesting the source asset comprises automatically computing values for asset-variation parameters of the source asset, where the asset-variation parameters are programmable for machine-learning; and generate a crowdsourced synthetic data asset comprising the values for asset-variation parameters. A value quantifier for the crowdsourced synthetic data asset is assigned. A crowdsourced synthetic data asset profile comprises asset-variation parameters. With reference to FIG. 5, crowdsource interface 500 is an example SDaaS interface that may support crowdsourcing, uploading, and tagging source assets for ingestion.

Automatic Suggestion of Variation Parameters

Returning to FIG. 1A, in some embodiments, suggested variation parameters for a particular machine learning scenario can be presented to facilitate generating a frameset package. Relevant variation parameters can be designated by seeding taxonomy 140, which associates machine learning scenarios with corresponding relevant subsets of variation parameters. Upon identification of a particular machine learning scenario via a user interface that facilitates scene generation and/or frameset generation (e.g., interface 128B or 128C), a subset of variation parameters associated with the identified scenario in seeding taxonomy 140 can be accessed and presented as suggested variation parameters. One or more of the suggested variation parameters and/or one or more additional variation parameters can be selected, frameset assembly engine 114 can generate framesets (e.g., images) by varying the selected variation parameters (e.g., asset and/or scene-variation parameters), and frameset package generator 116 can generate a frameset package with the generated framesets.

Generally, a user (e.g., a customer, data scientist, etc.) may seek to generate a frameset package (i.e., a synthetic dataset) for training a particular machine learning model. At a high level, a user interface may be provided (e.g., interface 128B or 128C) that facilitates scene generation and/or frameset generation. For example, the user interface may allow the user to design or otherwise specify a 3D scene (e.g., using 3D modeling software). The user interface may allow the user to specify one or more variation parameters to be varied in generating different framesets (e.g., images based on the 3D scene) for a frameset package. The number of potential variation parameters is theoretically unlimited. However, not all parameters can be varied to produce a frameset package that will improve the accuracy of a machine learning model for a given scenario.

In some scenarios such as facial recognition, variation parameters such as human body shape, latitude, longitude, angle of the sun, time of day, and camera perspective and position may be relevant for improving the accuracy of a corresponding machine learning model. In other scenarios such as using computer vision and optical character recognition (OCR) to read health insurance cards, some of these variation parameters are not relevant. More specifically, some variation parameters such as latitude, longitude, angle of the sun, and time of day may not be relevant for an OCR-based scenario, while other parameters such as camera perspective, camera position, and A to Z variability may be. Seeding taxonomy 140 may maintain the associations between machine learning scenarios and relevant variation parameters to present as suggested variation parameters for a particular scenario.

Seeding taxonomy 140 associates machine learning scenarios with relevant variation parameters for the scenarios. For example, seeding taxonomy 140 can include a list or other identification of various machine learning scenarios (e.g., OCR, facial recognition, video surveillance, spam detection, product recommendations, marketing personalization, fraud detection, data security, physical security screenings, financial trading, computer assisted diagnosis, online search, natural language processing, smart car controls, Internet of Things controls, and others). For any particular machine learning scenario, a relevant set of variation parameters (e.g., asset-variation parameters, scene-variation parameters, etc.) may be varied to produce a frameset package that can improve a corresponding machine learning model for the scenario. Seeding taxonomy 140 can associate one or more machine learning scenarios with corresponding relevant subsets of variation parameters. For example, the variation parameters across all scenarios may be assigned a unique identifier, and seeding taxonomy 140 can maintain lists of unique identifiers indicating relevant variation parameters for each scenario.

In some embodiments, the user interface that facilitates scene generation and/or frameset generation (e.g., interface 128B or 128C) can facilitate an identification of a desired machine learning scenario (e.g., based on a user input indicating a desired scenario). A list or other indication of the subset of variation parameters associated with the identified scenario in seeding taxonomy 140 can be accessed and presented as suggested variation parameters via the user interface. For example, the user interface may include a form that accepts an input indicting one or more machine learning scenarios. The input can be via a text box, drop down menu, radio button, checkbox, interactive list, or other suitable input. The input indicting a machine learning scenario can trigger a lookup and presentation of relevant variation parameters maintained in seeding taxonomy 140. The relevant variation parameters can be presented as a list or other indication of suggested variation parameters for a selected machine learning scenario. The user interface can accept an input indicating a selection of one or more of the suggested variation parameters and/or one or more additional variation parameters. As with the input indicating a machine learning scenario, the input indicating selected variation parameters can be via a text box, drop down menu, radio button, checkbox, interactive list, or other suitable input. The input indicting selected variation parameters can be used by frameset assembly engine 114 to generate framesets (e.g., images) by varying the selected variation parameters, and frameset package generator 116 can generate a frameset package with the generated framesets. The frameset package can be made available, for example, by download or otherwise.

Generally, seeding taxonomy 140 can be predetermined and/or adaptable. In embodiments in which seeding taxonomy 140 is adaptable, feedback loop engine 120 can track selected variation parameters for each machine learning scenario. Feedback loop engine 120 can update seeding taxonomy 140 based on a comparison of selected variation parameters for a particular frameset package to suggested variation parameters for a corresponding machine learning scenario. A variation parameter can be added or removed from the list or other indication of associated variation parameters for a particular scenario in seeding taxonomy 140 in various ways. For example, a variation parameter can be added or removed based on a determination that selected variation parameters for a particular frameset generation request differ from the suggested variation parameters in seeding taxonomy 140 for a corresponding machine learning scenario. This update to seeding taxonomy 140 may be performed based on a determined difference for a single request, for a threshold number of requests, a majority of requests, or other suitable criteria. As such, in these embodiments, the seeding taxonomy is evolving and self-healing.

Pre-Packaged Synthetic Datasets for Common Machine Learning Scenarios

In some embodiments, synthetic datasets (e.g., frameset packages) for common or anticipated machine learning scenarios can be pre-packaged by creating the dataset before a customer or other user requests the dataset. A user interface (e.g., interface 128B or 128C) can be provided that includes a form or other suitable tool that allows the user to specify a desired scenario. For example, a form may allow the user to specify an industry sector and a particular scenario within the sector. In response, a representation of available packages of synthetic data for that industry and scenario may be presented, the user may select an available package, and the selected package may be made available, for example, by download or otherwise.

Generally, synthetic datasets for any number of machine learning scenarios may be pre-packaged. For example, synthetic datasets may be pre-packaged for some common or anticipated scenarios in AI-heavy industries such as government, health care, retail, oil and gas, gaming, and finance. By pre-packaging synthetic datasets such as these, the substantial expenditure of computing resources that would otherwise be required to generate the datasets on demand can be avoided.

In some embodiments, a list or other indication of pre-packaged synthetic datasets can be presented via a user interface that facilitates scene generation and/or frameset generation (e.g., interface 128B or 128C). For example, the user interface can present a form that accepts an input indicting one or more industry sectors. The input can be via a text box, drop down menu, radio button, checkbox, interactive list, or other suitable input. The input indicting an industry sector can trigger a presentation of a list or other indication of pre-packaged synthetic datasets for the selected industry sector(s). The user interface can accept an input indicating a selection of one or more of the pre-packaged synthetic datasets. As with the input indicating an industry sector, the input indicating a pre-packaged synthetic dataset can be via a text box, drop down menu, radio button, checkbox, interactive list, or other suitable input. The input indicting a pre-packaged synthetic dataset can cause the selected pre-packaged synthetic dataset to be made available, for example, by download or otherwise.

Classification of Synthetic Data Tasks and Orchestration of Resource Allocation

Figure 6:
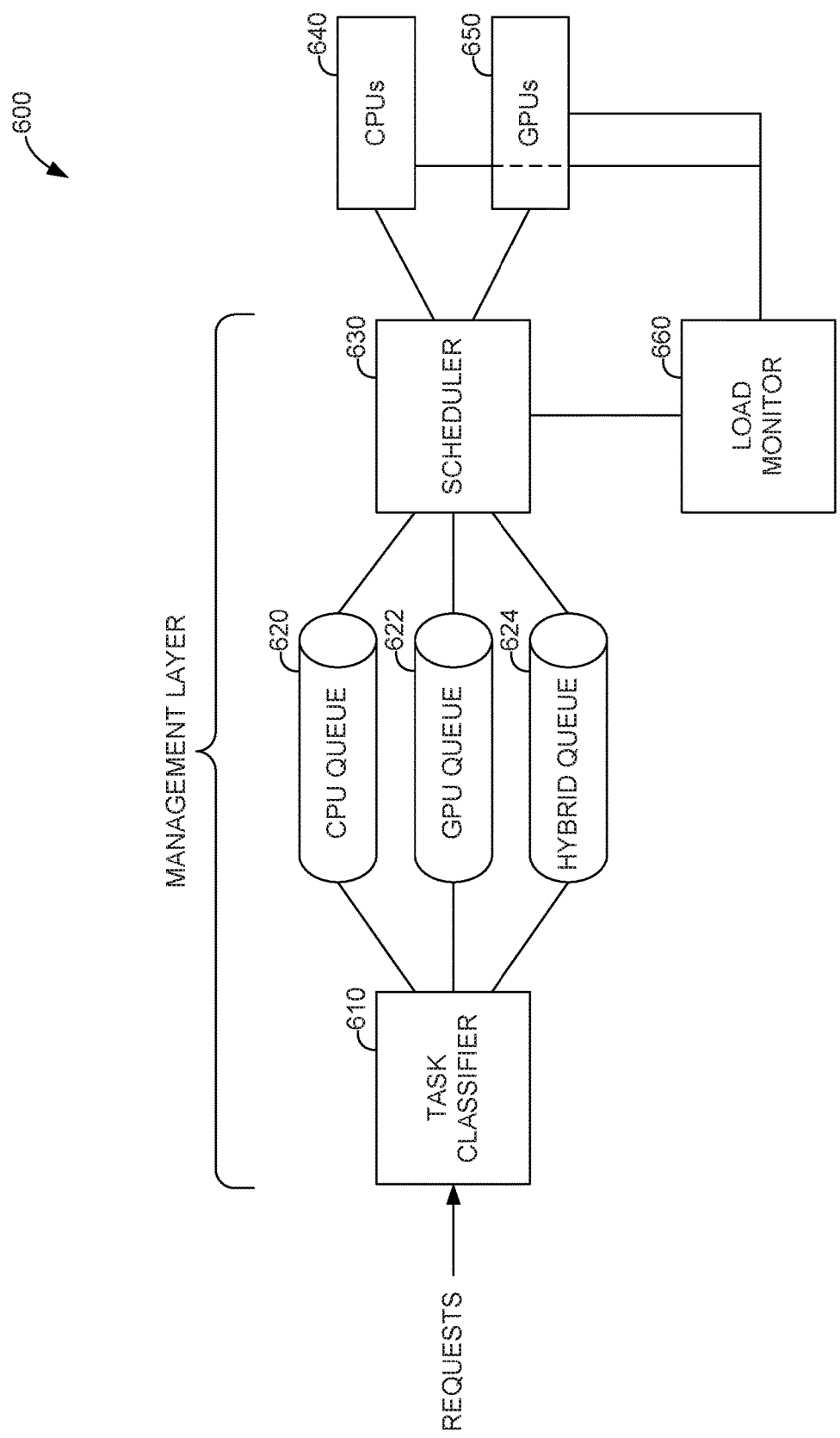
FIG. 6 is a block diagram illustrating an example distributed computing system synthetic data as a service workflow, in accordance with embodiments of the present invention.

Turning now to FIG. 6, FIG. 6 illustrates an example environment 600 in which requests to perform synthetic data tasks may be processed. The components of environment 600 may operate within a distributed computing system to provide functionality for the SDaaS described herein. Environment 600 supports processing synthetic data tasks such as generation or specification of source assets (e.g., 3D models), ingestion of source assets, simulation (e.g., identification and variation of first-tier and/or second-tier parameters), creation of synthetic data assets (e.g., rendering images based on 3D models), and the like.

Environment 600 includes task classifier 610, CPU queue 620, GPU queue 622, hybrid queue 624, scheduler 630, and load monitor 660 (collectively, the management layer). At a high level, the management layer can receive requests to perform synthetic data tasks. The management layer classifies the tasks and routes them to a group of processors (e.g., CPUs 640 or GPUs 650) for execution. In this manner, the management layer orchestrates a resource allocation between CPUs 640 and GPUs 650 to process synthetic data tasks. Environment 600 is merely an example environment, and variations are possible. For example, although embodiments herein refer to orchestration of an allocation between CPUs and GPUs, environment 600 may include any suitable processor/architecture (e.g., CPU, GPU, ASIC, FPGA, etc.), and a corresponding allocation may be orchestrated.

Task classifier 610 receives incoming requests to perform synthetic data tasks. Any given request can correspond to one or more synthetic data tasks. For example, a request to create a frameset package comprising 100 k synthetic data assets (e.g., images) may be broken down into any number of synthetic data tasks. In one example, the request can be broken down into synthetic data tasks that batch the creation of synthetic data assets (e.g., batches of 1 k, 5 k, 10 k, etc.), and the synthetic data tasks can be assigned to a particular processor (or group of processors) to generate a corresponding batch of synthetic data assets. More generally, any incoming request can be broken down into a set of corresponding synthetic data tasks. In this manner, task classifier 610 can generate one or more synthetic data tasks based on a received request.

Task classifier 610 classifies the synthetic data tasks by task category, eligible resource for processing the task, or some other criteria. For example, task classifier can identify the category of the task and a corresponding eligible resource for processing tasks in the category. In one example, synthetic data tasks relating to ingestion of synthetic data assets can be classified for processing on a CPU only (e.g., to avoid idling a GPU), or as a hybrid (e.g., eligible for processing on a CPU or a GPU). In another example, synthetic data tasks to create synthetic data assets (e.g., render images from a source asset) can be classified for processing on a GPU only (e.g., to minimize processing time), or as a hybrid (e.g., eligible for processing on a CPU or a GPU). Of course, these classifications are merely examples, and any other classification scheme may be implemented. Task categories and/or corresponding eligible resources can be predetermined, learned, or otherwise.

In some embodiments, task classifier 610 can queue synthetic data tasks in one or more queues. In one example, synthetic data tasks can be populated into a single queue, and scheduler 630 can select tasks from the queue for routing or assignment for processing on CPUs 640 or GPUs 650 (e.g., based on some property or other characteristic of the task indicating which resource the task should be assigned to). In another example, synthetic data tasks can be populated into multiple queues such as CPU queue 620, GPU queue 622, and hybrid queue 624. In this latter example, synthetic data tasks that are classified for processing only on CPUs 640 are placed in CPU queue 620, synthetic data tasks that are classified for processing only on GPUs 650 are placed in GPU queue 622, and synthetic data tasks that are classified for processing on CPUs 640 or GPUs 650 are placed in hybrid queue 624. It should be understood that the use of queues and/or task properties are merely example implementations, and other techniques are possible for indicating which resource(s) tasks should be assigned to.

In the embodiment illustrated in FIG. 6, scheduler 630 selects synthetic data tasks from CPU queue 620, GPU queue 622, and hybrid queue 624, and routes or otherwise assigns the tasks to a resource for processing (e.g., CPUs 640 or GPUs 650). Various criteria may be used to indicate which resource should be assigned. For example, a resource can be assigned based on a task classification (e.g., tasks classified as ingestion tasks can be assigned to CPUs 640), based on queueing (e.g., tasks from CPU queue 620 can be assigned to CPUs 640, for example, on a FIFO basis), based on a prioritization scheme (e.g., giving priority to a particular account or queue), based on scheduling (e.g., changing the assignment depending on time of day, week, year, etc.), based on resource availability, based on some other criteria, or some combination thereof. CPUs 640 and GPUs 650 can process assigned and/or routed tasks in any suitable manner.

In some embodiments, load monitor 660 receives telemetry or some other health or status signal from CPUs 640 and/or GPUs 650 that provides an indication of resource availability. As such, load monitor 660 can determine when a CPU or GPU is available. Load monitor 660 can provide an indication to scheduler 630 that a particular resource is available, and scheduler 630 can use this information in its determination of which resource to assign a particular task. For example, load monitor 660 can determine when a GPU is available (e.g., when a GPU enters a stand-by or pending mode) and can provide a corresponding signal or other indication to scheduler 630. Thus, scheduler 630 can route or otherwise assign a particular task (e.g., a classified and/or queued task) to the available GPU for execution. Tasks can be selected for routing or assignment (e.g., from a queue) based on various criteria, including classification of an eligible resource to process the task (e.g., GPU-only), based on the queue (e.g., giving priority to hybrid queue 624 or GPU queue 622), based on task category (e.g., giving priority to requests to create synthetic data), based on the time a request was received (e.g., giving priority to an earliest queued task across multiple queues), based on queue population (e.g., giving priority to the most populated queue), based on an estimated time to completion (e.g., giving priority to a queued task estimated to take the longest or shortest time to execute), or otherwise. These and other variations for assigning tasks to a particular resource are possible. As such, tasks in synthetic data creation can be routed or otherwise assigned to a particular resource for processing.

Progress Portal for Synthetic Data Tasks

Figure 7:
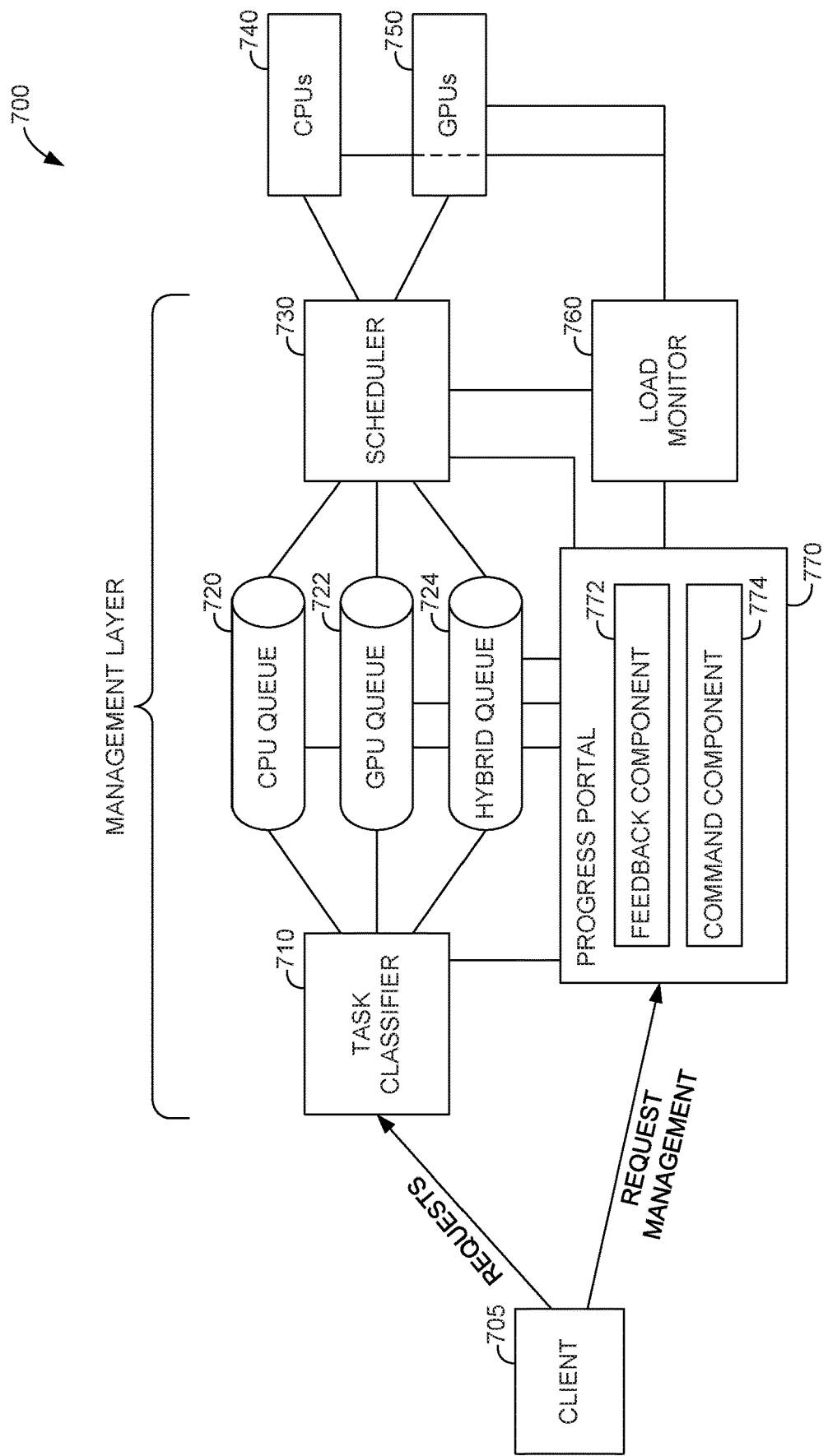
FIG. 7 is a block diagram illustrating an example distributed computing system synthetic data as a service workflow, in accordance with embodiments of the present invention.

FIG. 7 illustrates an example environment 700 in which requests to perform synthetic data tasks may be managed. The components of environment 700 may operate within a distributed computing system to provide functionality for the SDaaS described herein. Environment 700 supports processing synthetic data tasks such as generation or specification of source assets (e.g., 3D models), ingestion of source assets, simulation (e.g., identification and variation of first-tier and/or second-tier parameters), creation of synthetic data assets (e.g., rendering images based on 3D models), and the like. The components of environment 700 may correspond with the components of environment 600 in FIG. 6. For example, task classifier 710, CPU queue 720, GPU queue 722, hybrid queue 724, scheduler 730, and load monitor 760 of FIG. 7 may correspond with task classifier 610, CPU queue 620, GPU queue 622, hybrid queue 624, scheduler 630, and load monitor 660 of FIG. 6, respectively. Although embodiments herein are described using CPUs and GPUs, environment 700 may include any suitable processor/architecture (e.g., CPU, GPU, ASIC, FPGA, etc.) and corresponding queues.

Environment 700 includes progress portal 772 in the management layer. At a high level, progress portal 772 allows client device 705 to actively monitor SDaaS progress in processing a synthetic data request. Further, progress portal 772 allows client device 705 to issue commands to assign a resource to process a synthetic data task, even after processing a corresponding request has begun. Progress portal 772 can provide various types of feedback indicating progress in processing a request. In some embodiments, progress portal 772 can accept and execute commands to change or add resources to process a request (or a corresponding task), or otherwise coordinate a resource allocation on the fly (e.g., mid-request).

In the embodiment illustrated in FIG. 7, progress portal 772 includes feedback component 772 and command component 774. Progress portal 772 is communicatively coupled to the components in the management layer and/or CPUs 740 and GPUs 750. As such, feedback component can monitor the progress of a particular synthetic data request and corresponding synthetic data tasks through the management layer and through execution on CPUs 740 and GPUs 750. Feedback component 772 can present (or otherwise cause a presentation on client device 705 of) information about the processing of a synthetic data request. Among other types of feedback, feedback component 772 may present an indication of the overall progress of the request processing (e.g., percent completion, number of synthetic data assets created, number of synthetic data assets remaining to be created, etc.), CPU/GPU usage, average time spent for synthetic data creation on a CPU, average time spent for synthetic data creation on a GPU, estimated time left (e.g., based on an existing or estimated pattern of creation), a corresponding service cost (e.g., incurred, estimated or predicted for completion of processing a request, etc.), or other information. In this manner, a user or account that issued a particular synthetic data request can monitor progress in processing the request.

In some embodiments, command component 774 may communicate with a command interface associated with client device 705. A user can input a command using the command interface, and the command can be transmitted to command component 774 for execution. Command component 774 can accept and execute various commands, including commands to assign a resource to process a synthetic data request, batch the creation of synthetic assets or the processing of some other synthetic data request, change or automatically target a particular outcome (e.g., processing time, cost, output quality, etc.), and the like. Command component 774 may support execution of commands even after beginning to process a request (mid-request).

For example, command component 774 can accept and execute a command to assign resources to process a synthetic data request. By way of nonlimiting example, processing a request to create a large number of synthetic data assets can take on the order of hours. While, feedback component 772 can provide information about the processing of the request (progress, allocated resources, resource consumption, etc.), command component 774 can allow a user to impact the manner in which the request is processed. For example, assume a request to generate 50 k assets has begun processing, and 10 k assets have been generated using CPUs 740. A user may prefer to speed up processing. In this situation, the user can issue a command via command component 774 to generate the remaining synthetic data assets using GPUs 750. Command component 774 can execute such a command in various ways. For example, command component 774 can identify corresponding synthetic data tasks that have not yet been routed or assigned to CPUs 740 (e.g., by identifying the synthetic data tasks queued in CPU queue 720 and/or hybrid queue 724), and can reclassify the synthetic data tasks for processing on GPUs 750 (e.g., by moving the synthetic data tasks to GPU queue 722). As such, scheduler 730 can pick up the synthetic data tasks from GPU queue 722 and route or otherwise assign them for processing on GPUs 750. In this manner, a user can manually change a resource allocation (e.g., a task classification) on the fly by issuing a command via progress portal 770.

In some embodiments, command component 774 can support commands to change or automatically target a particular outcome. For example, the command interface can allow a user to issue a command to command component 774 to reduce or increase (or minimize or maximize) a derived processing characteristic, such as processing time, cost, quality of output, or the like. In this manner, the command interface can trigger command component 774 to reduce and/or minimize processing time (e.g., by assigning synthetic data tasks to GPUs 750 on the fly), to reduce and/or minimize cost (e.g., by assigning tasks to execute on a relatively cheaper processor such as a CPU, by automatically reducing a size or quality of generated synthetic data assets, etc.), and the like. In some embodiments, a user may issue a command directly setting the quality of output (e.g., size or quality of generated synthetic data assets). Additionally or alternatively, consuming a threshold amount of resources (and/or incurring a threshold cost) can trigger an automatic halt to further processing of requests, tasks, a particular classification thereof, or otherwise. The threshold may be pre-defined (e.g., by a service level agreement, by an incoming request, etc.), and may be changed on the fly (e.g., by a received command). In some embodiments, a command can be issued to stop further processing of requests, tasks, a particular classification thereof, or otherwise. These are just a few examples of the possible commands that can be implemented.

Example Flow Diagrams

With reference to FIGS. 8-14, flow diagrams are provided illustrating methods for implementing distributed computing system synthetic data as a service. The methods can be performed using the distributed computing system described herein. In embodiments, one or more computer storage media having computer-executable instructions embodied thereon that, when executed, by one or more processors, can cause the one or more processors to perform the methods in the distributed computing system 100.

Figure 8:
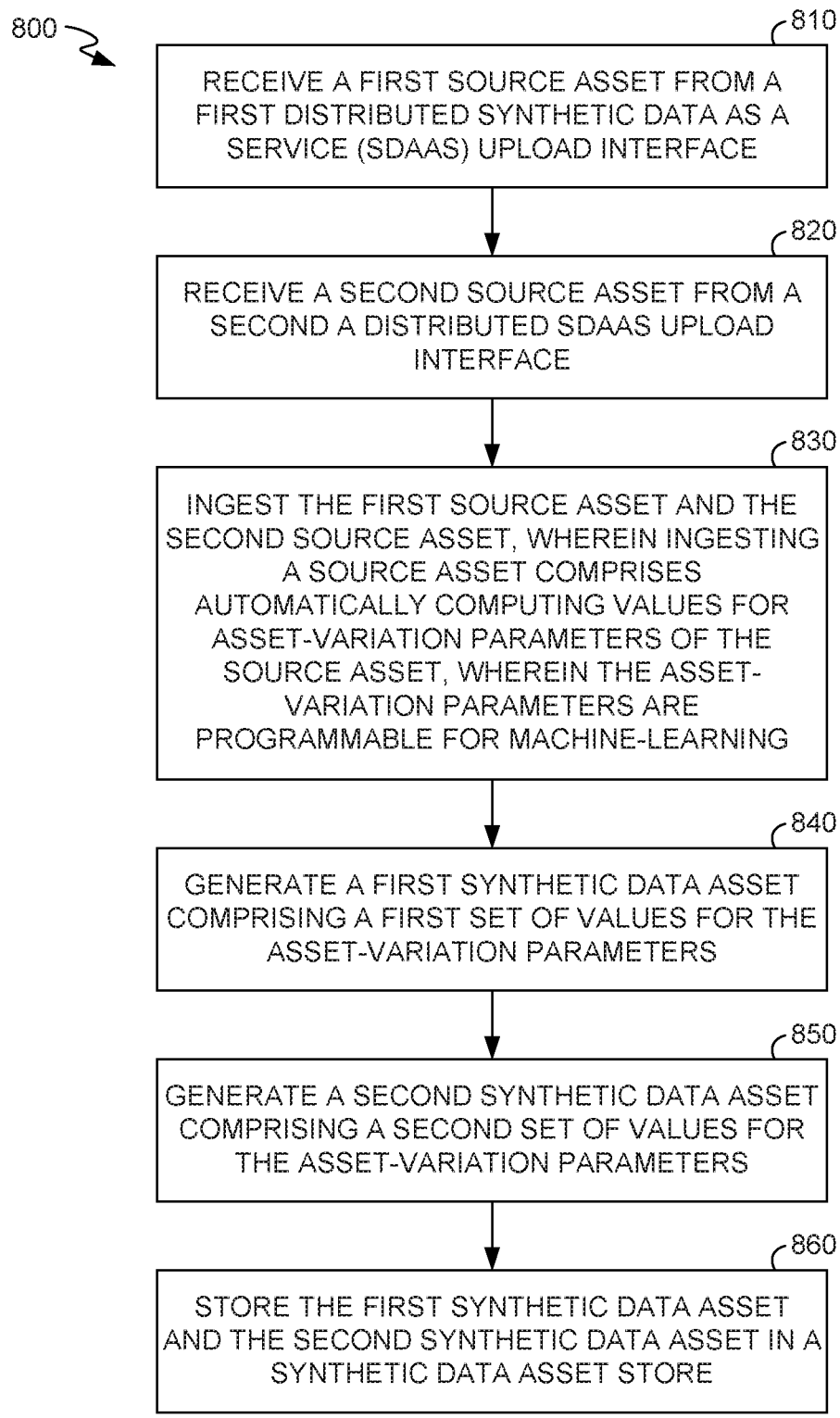
FIG. 8 is a flow diagram illustrating an example distributed computing system synthetic data as a service operation, in accordance with embodiments of the present invention.

FIG. 8 is a flow diagram illustrating a process 800 for implementing a distributed computing system asset assembly engine according to embodiments. Initially at block 810, a first source asset is received from a first distributed Synthetic Data as a Service (SDaaS) upload interface. At block 820, a second source asset is received from a second a distributed SDaaS upload interface. At block 830, the first source asset and the second source asset are ingested. Ingesting a source asset comprises automatically computing values for asset-variation parameters of the source asset, where the asset-variation parameters are programmable for machine-learning. At block 840, a first synthetic data asset comprising a first set of values for the asset-variation parameters is generated. At block 850, a second synthetic data asset comprising a second set of values for the asset-variation parameters is generated. At block 860, the first synthetic data asset and the second synthetic data asset are stored in a synthetic data asset store.

Figure 9:
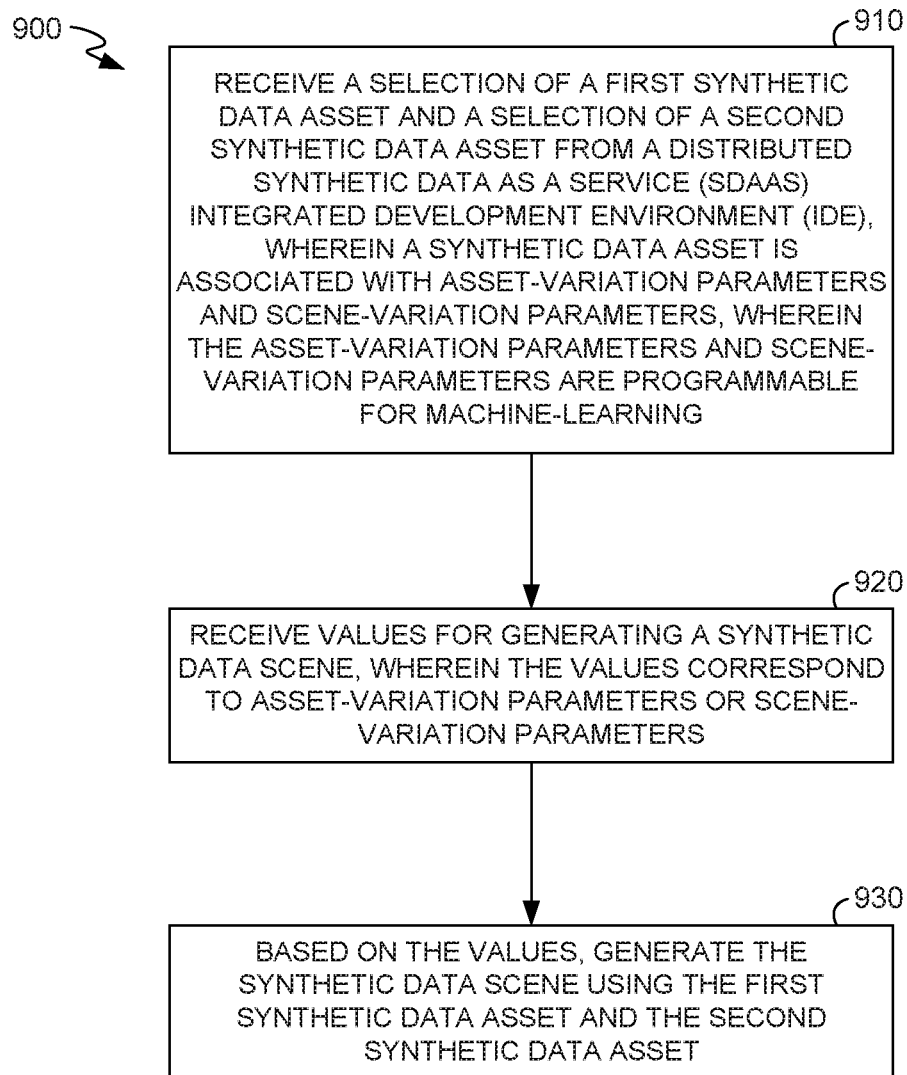
FIG. 9 is a flow diagram illustrating an example distributed computing system synthetic data as a service operation, in accordance with embodiments of the present invention.

FIG. 9 is a flow diagram illustrating a process 900 for implementing a distributed computing system scene assembly engine according to embodiments. Initially at block 910, a selection of a first synthetic data asset and a selection of a second synthetic data asset are received from a distributed synthetic data as a service (SDaaS) integrated development environment (IDE). A synthetic data asset is associated with asset-variation parameters and scene-variation parameters, the asset-variation parameters and scene-variation parameters are programmable for machine-learning. At block 920, values for generating a synthetic data scene are received. The values correspond to asset-variation parameters or scene-variation parameters. At block 930, based on the values, the synthetic data scene is generated using the first synthetic data asset and the second synthetic data asset.

Figure 10:
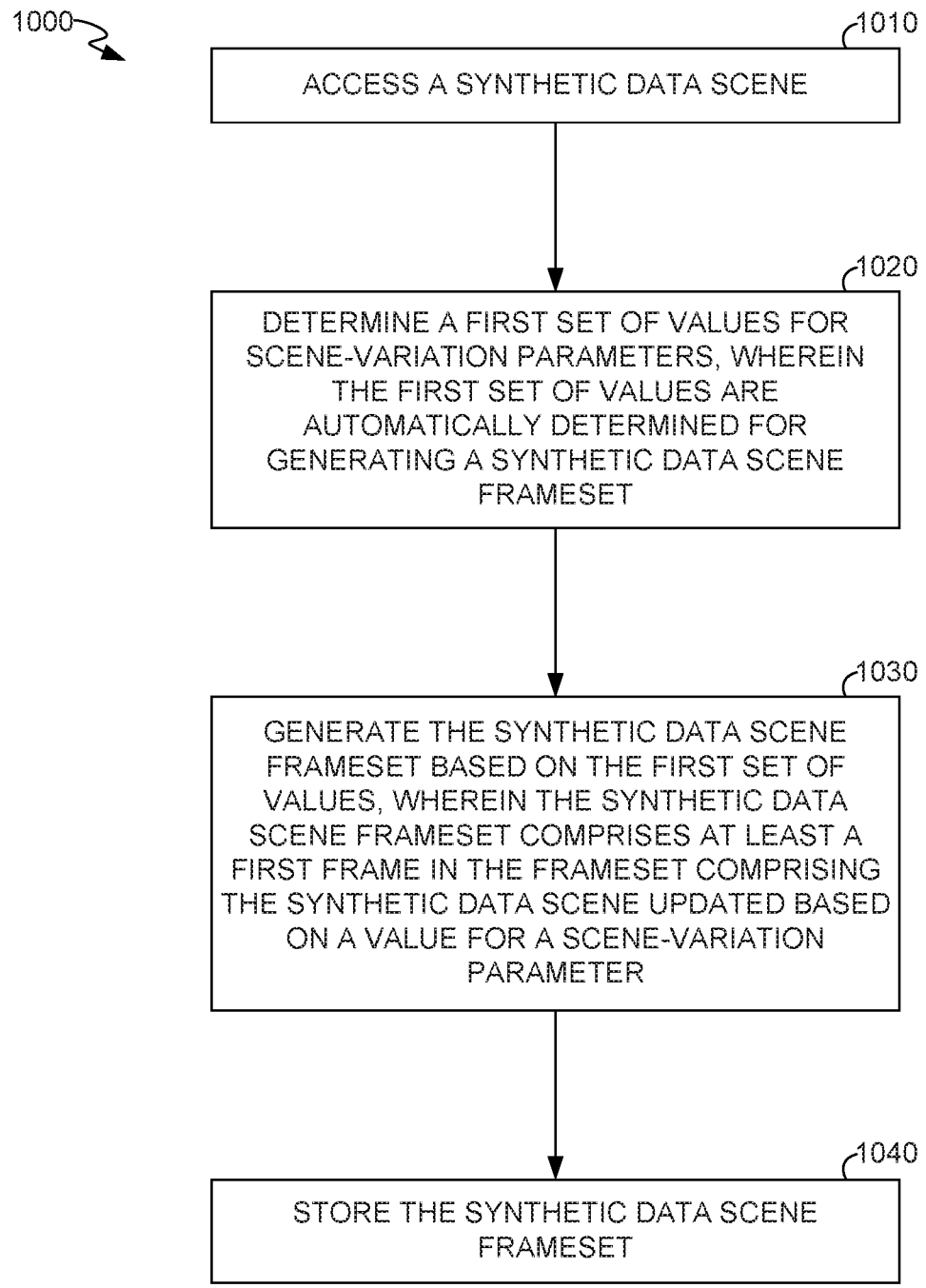
FIG. 10 is a flow diagram illustrating an example distributed computing system synthetic data as a service operation, in accordance with embodiments of the present invention.

FIG. 10 is a flow diagram illustrating a process 1000 for implementing a distributed computing system frameset assembly engine according to embodiments. Initially at block 1010, a synthetic data scene is accessed. At block 1020, a first set of values for scene-variation parameters is determined. The first set of values are automatically determined for generating a synthetic data scene frameset. At block 1030, the synthetic data scene frameset is generated based on the first set of values. The synthetic data scene frameset comprises at least a first frame in the frameset comprising the synthetic data scene updated based on a value for a scene-variation parameter. At block 1040, the synthetic data scene frameset is stored.

Figure 11:
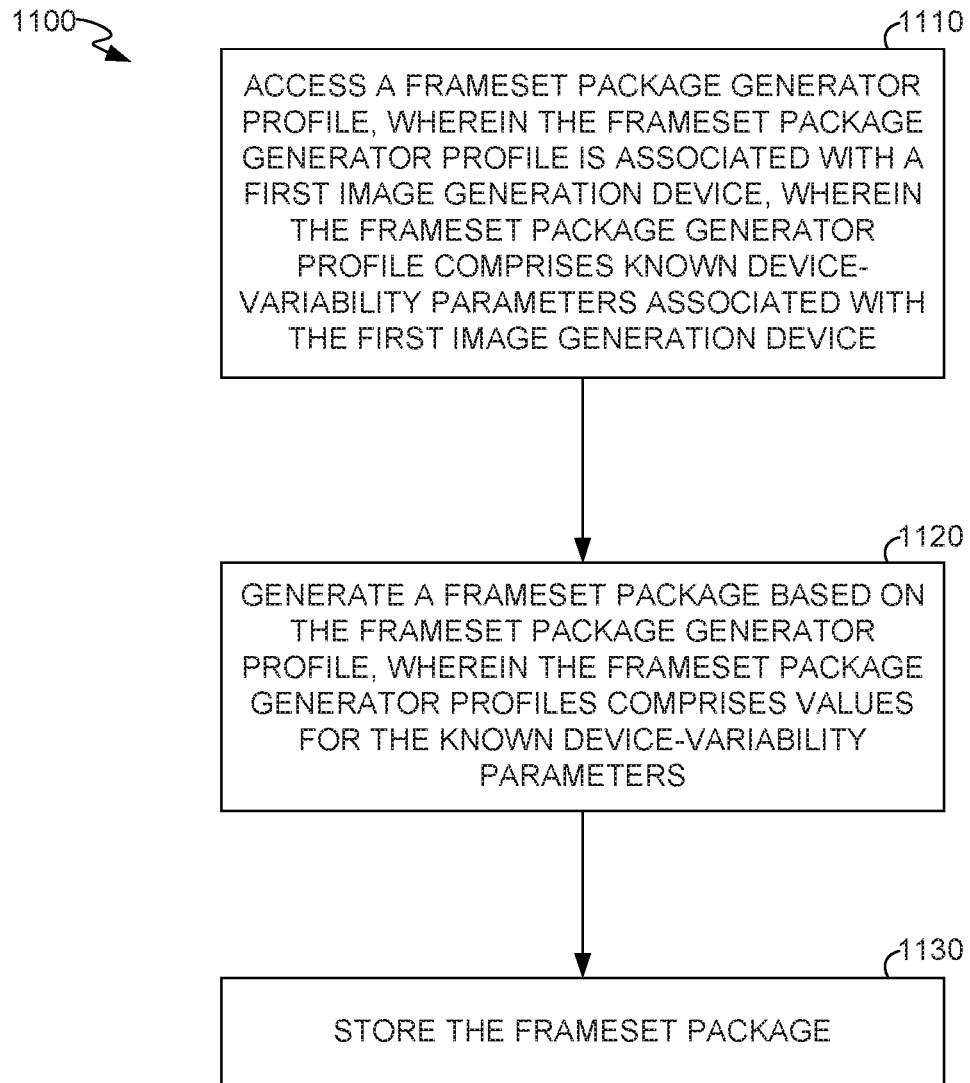
FIG. 11 is a flow diagram illustrating an example distributed computing system synthetic data as a service operation, in accordance with embodiments of the present invention.

FIG. 11 is a flow diagram illustrating a process 1100 for implementing a distributed computing frameset package generator according to embodiments. At block 1110, a frameset package generator profile is accessed. The frameset package generator profile is associated with a first image generation device. The frameset package generator profile comprises known device-variability parameters associated with the first image generation device. At block 1120, a frameset package is generated based on the frameset package generator profile. The frameset package generator profile comprises values for the known device-variability parameters. At block 1130, the frameset package is stored.

Figure 12:
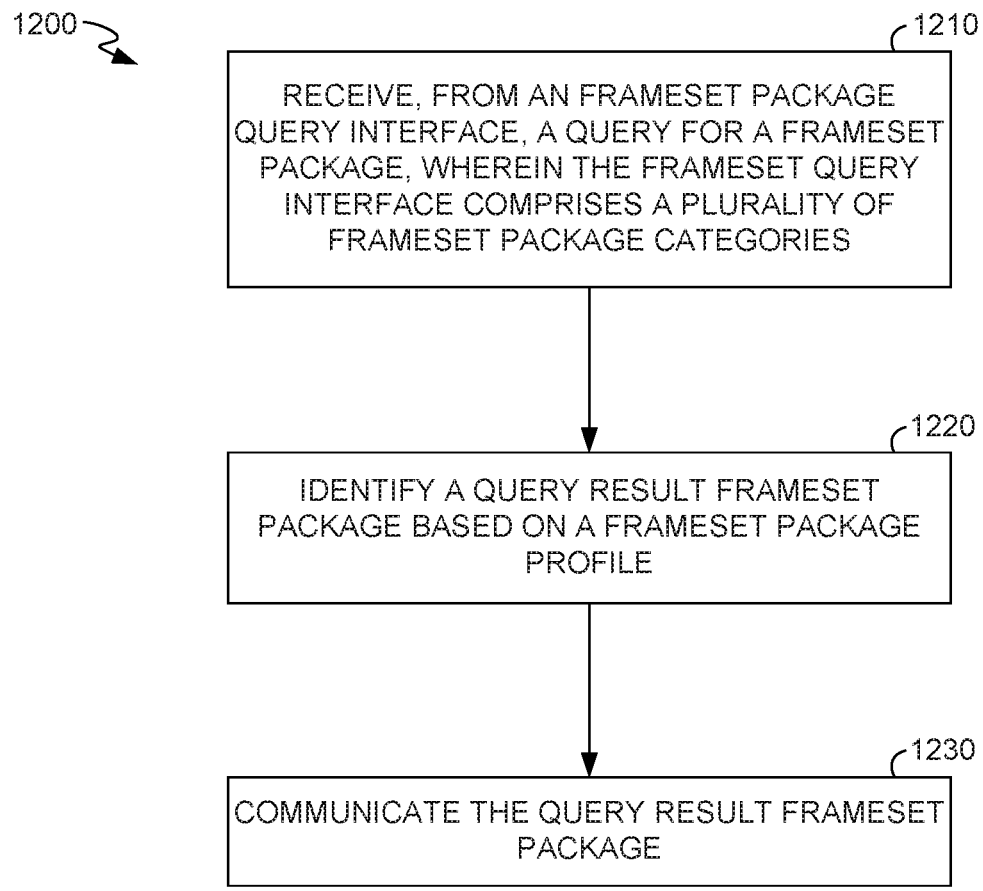
FIG. 12 is a flow diagram illustrating an example distributed computing system synthetic data as a service operation, in accordance with embodiments of the present invention.

FIG. 12 is a flow diagram illustrating a process 1200 for implementing a distributed computing system frameset package store according to embodiments. At block 1210, a query for a frameset package is received from a frameset package query interface. The frameset query interface comprises a plurality of frameset package categories. At block 1220 a query result frameset package is identified based on a frameset package profile. At block 1230, the query result frameset package is communicated.

Figure 13:
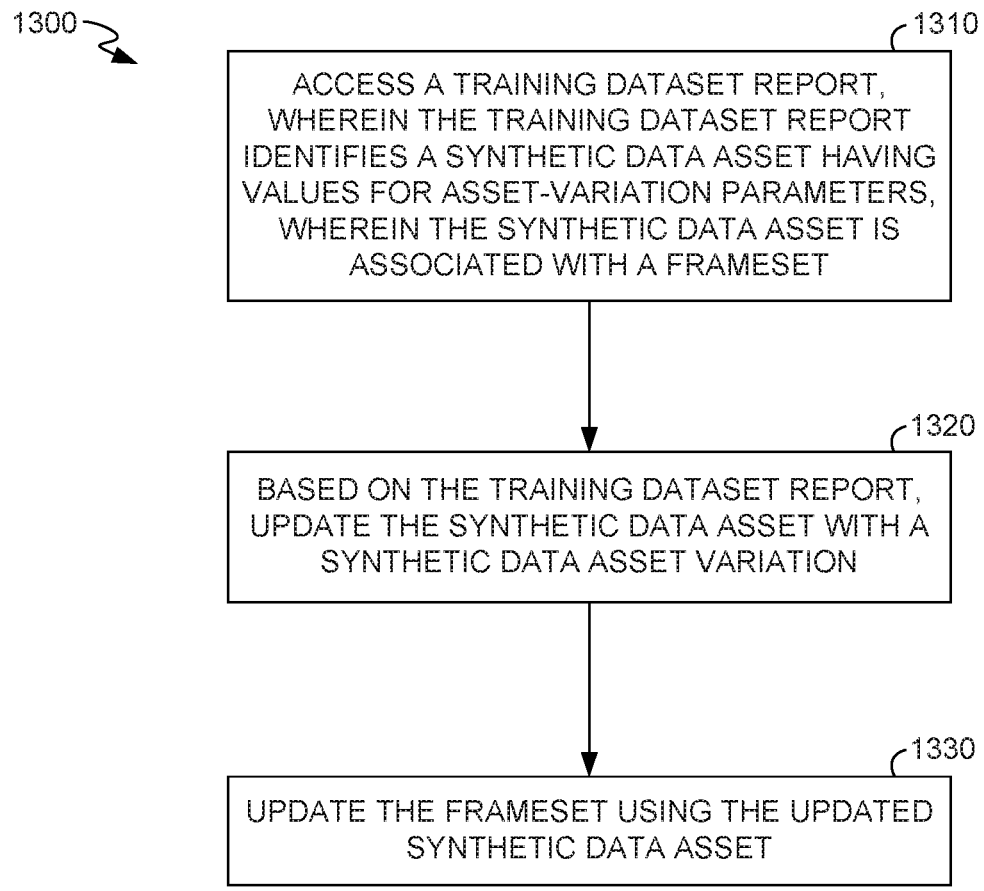
FIG. 13 is a flow diagram illustrating an example distributed computing system synthetic data as a service operation, in accordance with embodiments of the present invention.

FIG. 13 is a flow diagram illustrating a process 1300 for implementing a distributed computing system feedback loop engine according to embodiments. At block 1310, a training dataset report is accessed. The training dataset report identifies a synthetic data asset having values for asset-variation parameters. The synthetic data asset is associated with a frameset. At block 1320, based on the training dataset report, the synthetic data asset with a synthetic data asset variation is updated. At block 1330, the frameset is updated using the updated synthetic data asset.

Figure 14:
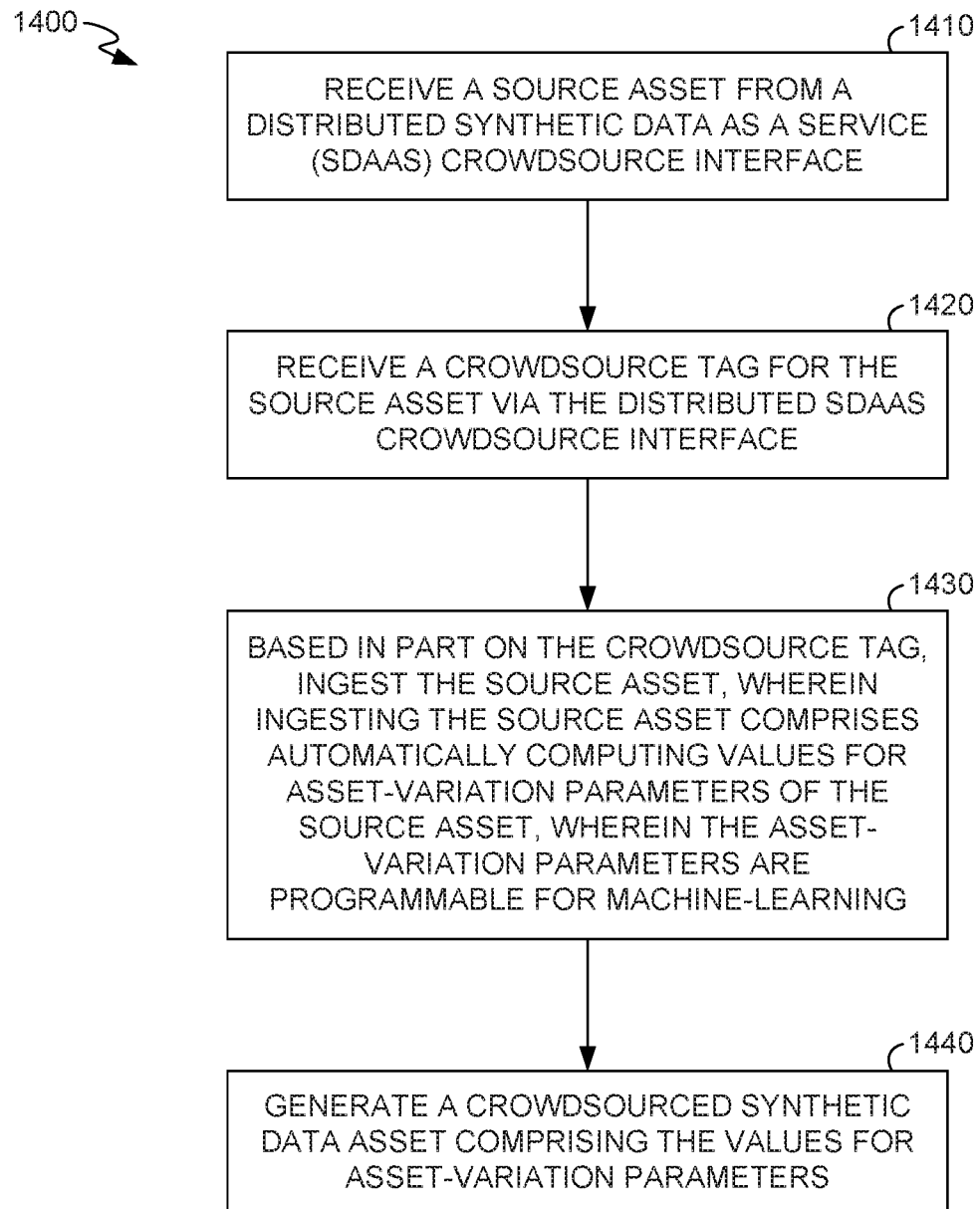
FIG. 14 is a flow diagram illustrating an example distributed computing system synthetic data as a service operation, in accordance with embodiments of the present invention.

FIG. 14 is a flow diagram illustrating a process 1400 for implementing a distributed computing system crowdsourcing engine according to embodiments. At block 1410, a source asset is received from a distributed synthetic data as a service (SDaaS) crowdsource interface. At block 1420, a crowdsource tag is received for the source asset via the distributed SDaaS crowdsource interface. At block 1430, based in part on the crowdsource tag, the source asset is ingested. Ingesting the source asset comprises automatically computing values for asset-variation parameters of the source asset. The asset-variation parameters are programmable for machine-learning. At block 1440, a crowdsourced synthetic data asset comprising the values for asset-variation parameters is generated.

Figure 15:
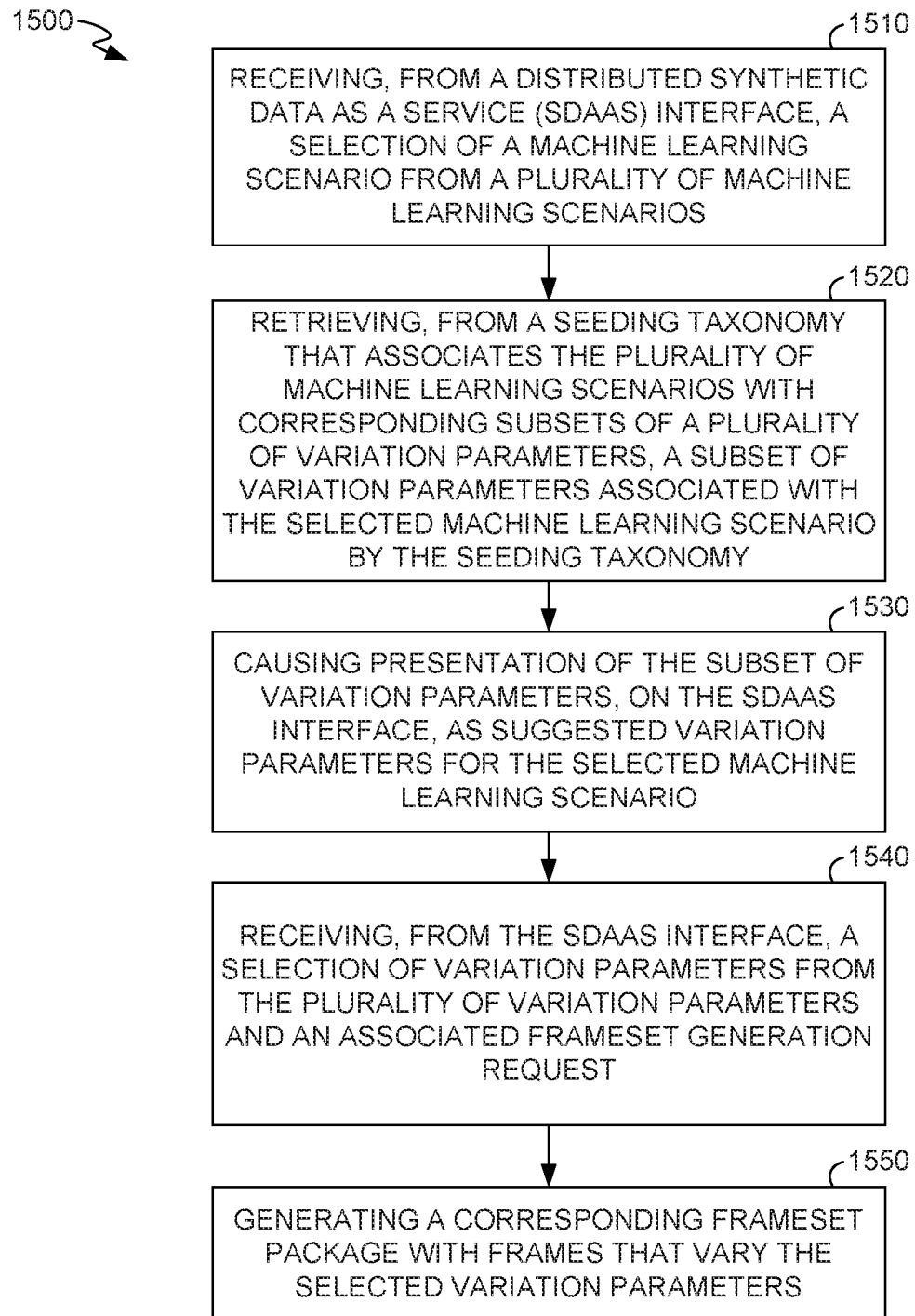
FIG. 15 is a flow diagram illustrating an example method for suggesting variation parameters, in accordance with embodiments of the present invention.

FIG. 15 is a flow diagram illustrating a process 1500 for suggesting variation parameters, in accordance with embodiments of the present invention. At block 1510, a selection of a machine learning scenario from a plurality of machine learning scenarios is received from a distributed Synthetic Data as a Service (SDaaS) interface. At block 1520, a subset of variation parameters associated with the selected machine learning scenario is retrieved from a seeding taxonomy that associates the plurality of machine learning scenarios with corresponding subsets of a plurality of variation parameters. At block 1530, presentation of the subset of variation parameters as suggested variation parameters for the selected machine learning scenario is caused on the SDaaS interface. At block 1540, a selection of variation parameters from the plurality of variation parameters and an associated frameset generation request is received from the SDaaS interface. At block 1550, a corresponding frameset package is generated with frames that vary the selected variation parameters.

Figure 16:
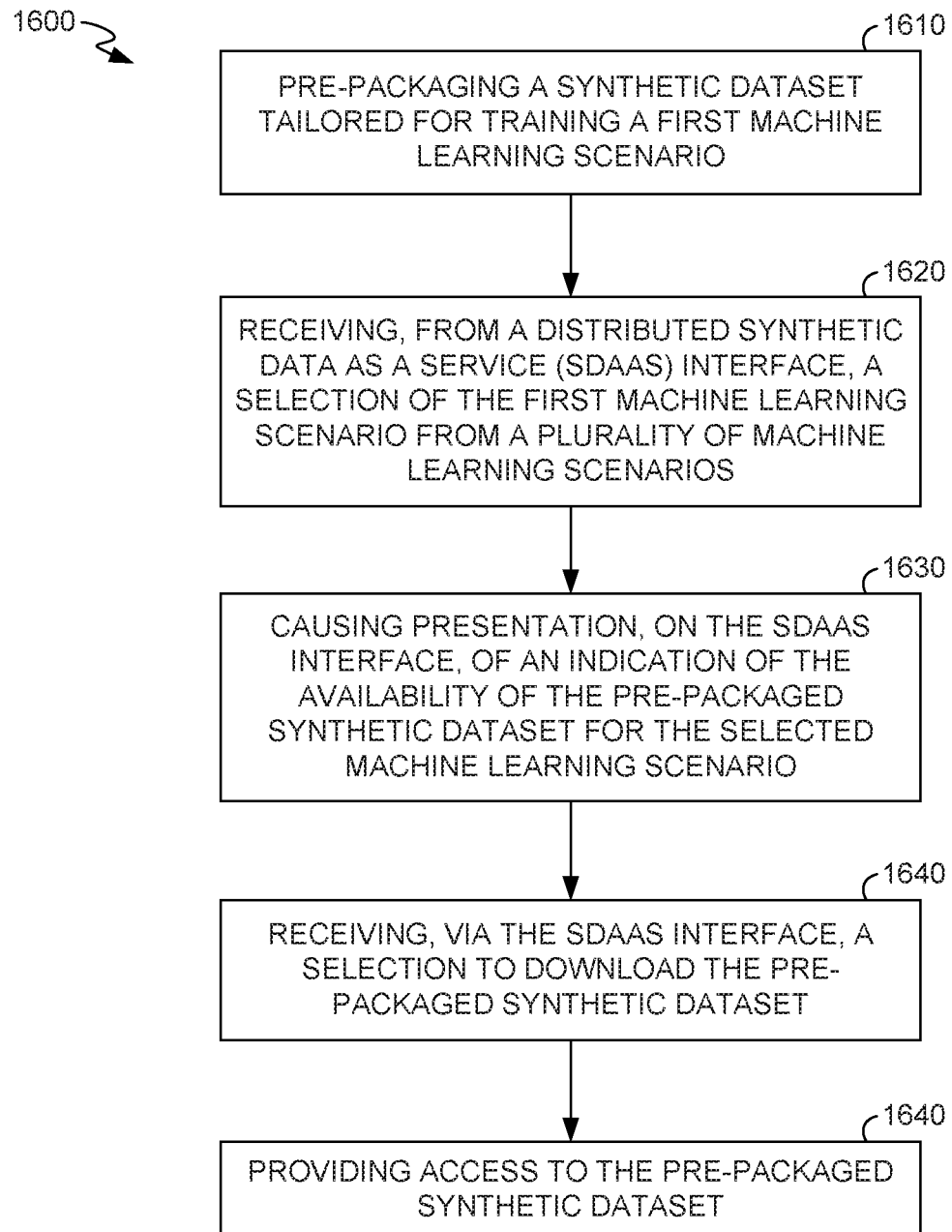
FIG. 16 is a flow diagram illustrating an example method for pre-packaging synthetic datasets, in accordance with embodiments of the present invention.

FIG. 16 is a flow diagram illustrating a process 1600 for pre-packaging synthetic datasets, in accordance with embodiments of the present invention. At block 1610, a synthetic dataset tailored for training a first machine learning scenario is pre-packaged. At block 1620, a selection of the first machine learning scenario from a plurality of machine learning scenarios is received from a distributed Synthetic Data as a Service (SDaaS) interface. At block 1630, presentation is caused on the SDaaS interface of an indication of the availability of the pre-packaged synthetic dataset for the selected machine learning scenario. At block 1640, a selection to download the pre-packaged synthetic dataset is received via the SDaaS interface. At block 1650, access to the pre-packaged synthetic dataset is provided.

Figure 17:
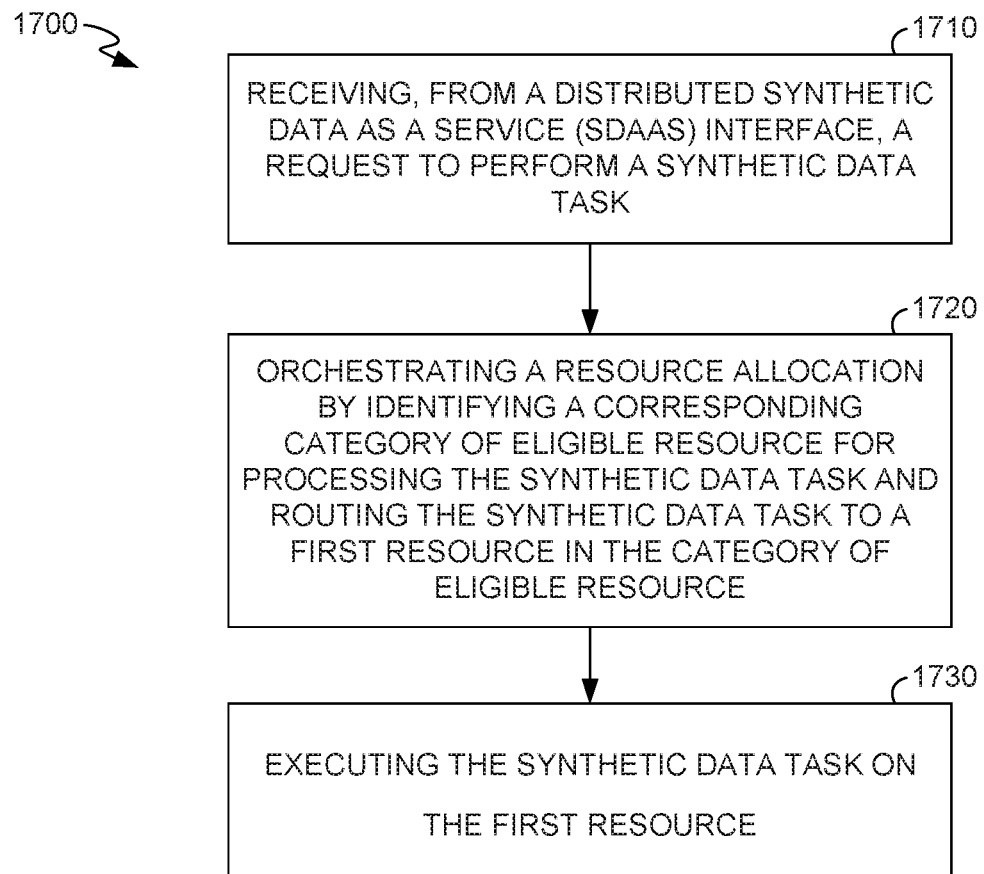
FIG. 17 is a flow diagram illustrating an example method for orchestrating a resource allocation, in accordance with embodiments of the present invention.

FIG. 17 is a flow diagram illustrating a process 1700 for orchestrating a resource allocation, in accordance with embodiments of the present invention. At block 1710, a request to perform a synthetic data task is received from a distributed Synthetic Data as a Service (SDaaS) interface. At block 1720, a resource allocation is orchestrated by identifying a corresponding category of eligible resource for processing the synthetic data task and routing the synthetic data task to a first resource in the category of eligible resource. At block 1730, the synthetic data task is executed on the first resource.

Figure 18:
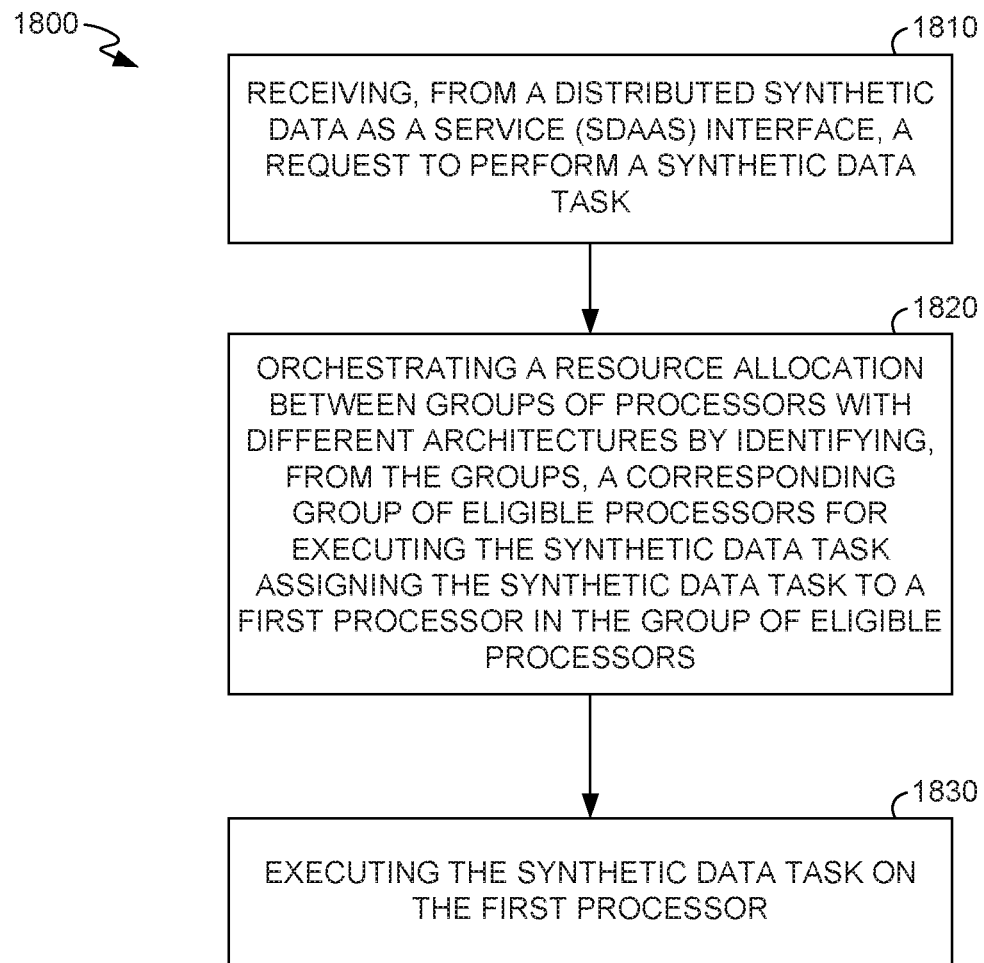
FIG. 18 is a flow diagram illustrating an example method for orchestrating a resource allocation between groups of processors with different architectures, in accordance with embodiments of the present invention.

FIG. 18 is a flow diagram illustrating a process 1800 for orchestrating a resource allocation between groups of processors with different architectures, in accordance with embodiments of the present invention. At block 1810, a request to perform a synthetic data task is received from a distributed Synthetic Data as a Service (SDaaS) interface. At block 1820, a resource allocation between groups of processors with different architectures is orchestrated by identifying, from the groups, a corresponding group of eligible processors for executing the synthetic data task assigning the synthetic data task to a first processor in the group of eligible processors. At block 1830, the synthetic data task is executed on the first processor.

Figure 19:
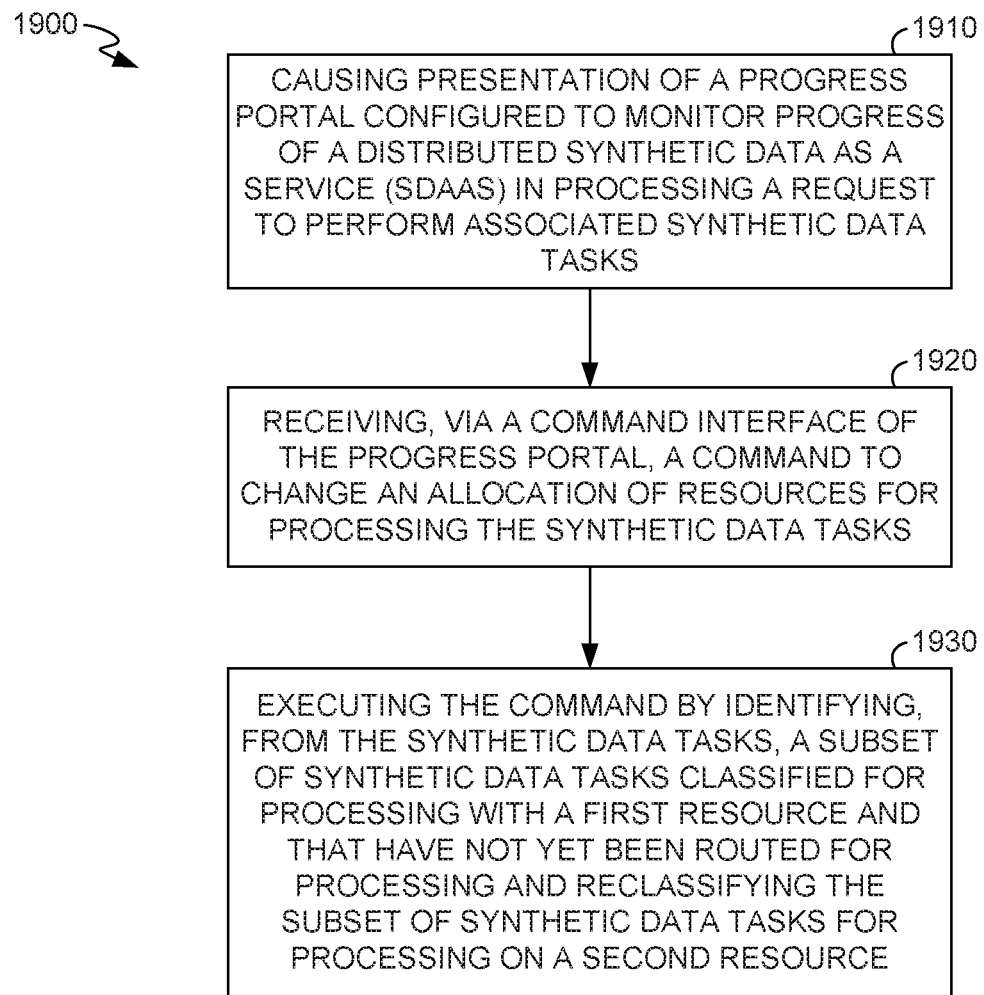
FIG. 19 is a flow diagram illustrating an example method for changing a resource allocation, in accordance with embodiments of the present invention.

FIG. 19 is a flow diagram illustrating a process 1900 for changing a resource allocation, in accordance with embodiments of the present invention. At block 1910, presentation is caused of a progress portal configured to monitor progress of a distributed Synthetic Data as a Service (SDaaS) in processing a request to perform associated synthetic data tasks. At block 1920, a command to change an allocation of resources for processing the synthetic data tasks is received via a command interface of the progress portal. At block 1930, the command is executed by identifying, from the synthetic data tasks, a subset of synthetic data tasks classified for processing with a first resource and that have not yet been routed for processing and reclassifying the subset of synthetic data tasks for processing on a second resource.

Figure 20:
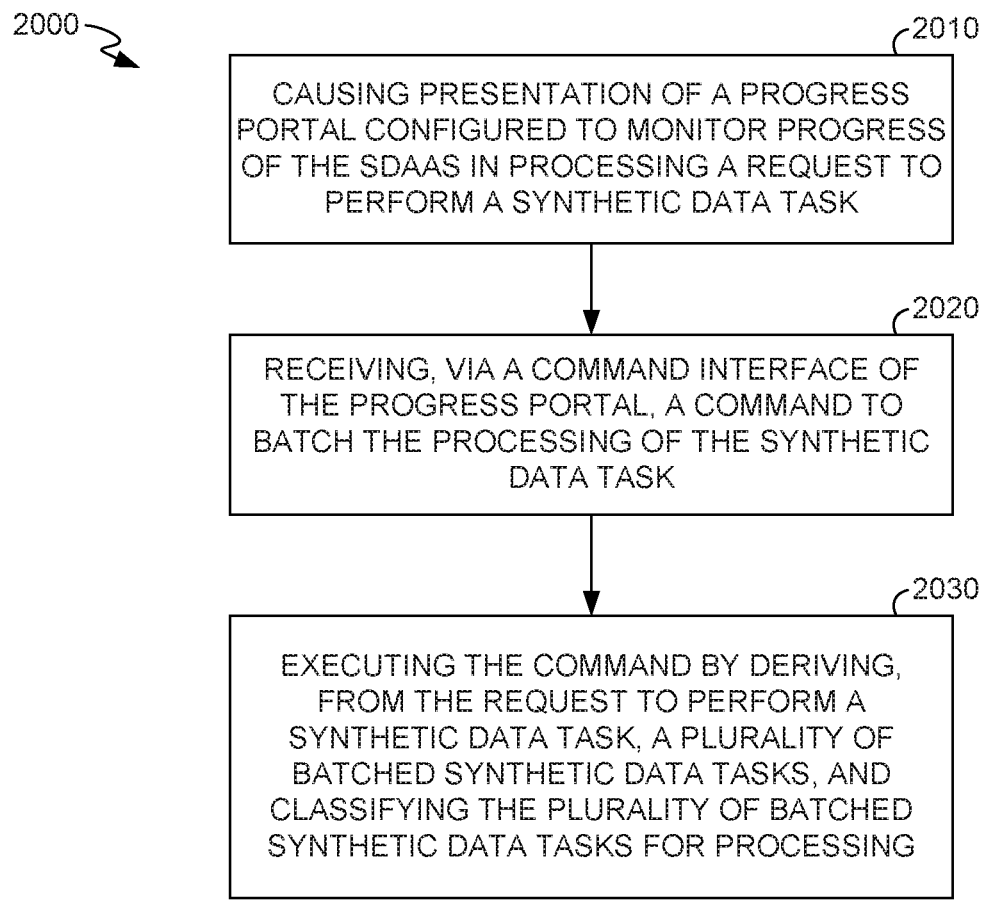
FIG. 20 is a flow diagram illustrating an example method for batching the processing of a synthetic data task, in accordance with embodiments of the present invention.

FIG. 20 is a flow diagram illustrating a process 2000 for batching the processing of a synthetic data task, in accordance with embodiments of the present invention. At block 2010, presentation is caused of a progress portal configured to monitor progress of the SDaaS in processing a request to perform a synthetic data task. At block 2020, a command to batch the processing of the synthetic data task is received via a command interface of the progress portal. At block 2030, the command is executed by deriving, from the request to perform a synthetic data task, a plurality of batched synthetic data tasks, and classifying the plurality of batched synthetic data tasks for processing.

Figure 21:
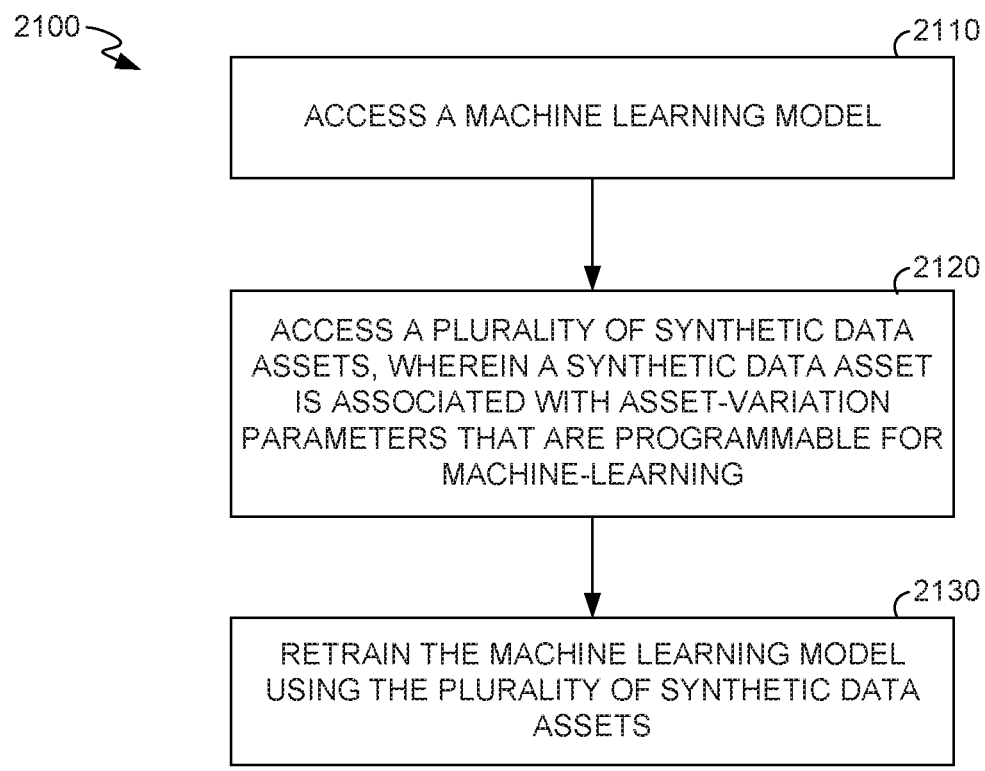
FIG. 21 is a flow diagram illustrating an example method for retrain a machine learning model using a plurality of synthetic data assets.

FIG. 21 is a flow diagram illustrating a process 2100 for retraining a machine learning model, in accordance with embodiments of the present invention. At block 2110, a machine learning model is accessed. At block 2120, a plurality of synthetic data assets is accessed, where a synthetic data asset is associated with asset-variation parameters that are programmable for machine-learning. At block 2130, the machine learning model is retrained using the plurality of synthetic data assets.

Advantageously, embodiments described herein improve computing functions and operations for generating training datasets based on providing synthetic data as a service using a distributed computing system. In particular, the improvement to computing functions and operations is associated with a distributed infrastructure for mass production of training datasets based on SDaaS operations. For example, the computing operations required for manual development (e.g., labeling and tagging) and refinement (e.g., searching) of training datasets are obviated based on SDaaS operations that automatically develop training datasets using synthetic data assets and automatically refine training datasets based on training dataset reports indicating additional synthetic data assets or scenes that would improve a machine-learning model in a machine-learning training service.

Moreover, the storage and retrieval of training datasets is improved using an internal machine-learning training service that operates in the same distributed computing system, thus alleviating computation overhead. The SDaaS operations are implemented based on an unconventional arrangement of engines and a set of defined unconventional rules for an ordered combination of steps of the SDaaS system. In this regard, the SDaaS addresses problems arising out of manual development of machine-learning training datasets and improves on existing processes for training machine-learning models in a distributed computing system. Overall, these improvements also result in less CPU computation, smaller memory requirements, and increased flexibility in generating and utilizing machine-learning training datasets.

EXAMPLE EMBODIMENTS OF THE PRESENT INVENTION

Accordingly, one example embodiment of the present invention provides a distributed computing system asset assembly engine. The asset assembly engine is configured to receive a first source asset from a first distributed Synthetic Data as a Service (SDaaS) upload interface. The asset assembly engine is also configured to receive a second source asset from a second a distributed SDaaS upload interface. The asset assembly engine is also configured to ingest the first source asset and the second source asset. Ingesting a source asset comprises automatically computing values for asset-variation parameters of the source asset. The asset-variation parameters are programmable for machine-learning. The asset assembly engine is also configured to generate a first synthetic data asset comprising a first set of values for the as set-variation parameters. The asset assembly engine is also configured to generate a second synthetic data asset comprising a second set of values for the asset-variation parameters. The asset assembly engine is also configured to store the first synthetic data asset and the second synthetic data asset in a synthetic data asset store.

Another example embodiment of the present invention provides a distributed computing system scene assembly engine. The scene assembly engine is configured to receive a selection of a first synthetic data asset and a selection of a second synthetic data asset from a distributed synthetic data as a service (SDaaS) integrated development environment (IDE). A synthetic data asset is associated with asset-variation parameters and scene-variation parameters. The asset-variation parameters and scene-variation parameters are programmable for machine learning. The engine is also configured to receive values for generating a synthetic data scene. The values correspond to asset-variation parameters or scene-variation parameters. The scene assembly engine is also configured to, based on the values, generate the synthetic data scene using the first synthetic data asset and the second synthetic data asset.

Another example embodiment of the present invention provides a distributed computing system frameset assembly engine. The frameset assembly engine is configured to access a synthetic data scene. The frameset assembly engine is also configured to determine a first set of values for scene-variation parameters. The first set of values are automatically determined for generating a synthetic data scene frameset. The frameset assembly engine is also configured to generate the synthetic data scene frameset based on the first set of values. The synthetic data scene frameset comprises at least a first frame in the frameset comprising the synthetic data scene updated based on a value for a scene-variation parameter. The frameset assembly engine is also configured to store the synthetic data scene frameset.

Another example embodiment of the present invention provides a distributed computing system frameset package generator. The frameset package generator is configured to access a frameset package generator profile. The frameset package generator profile is associated with a first image generation device. The frameset package generator profile comprises known device-variability parameters associated with the first image generation device. The frameset package generator is also configured to generate a frameset package based on the frameset package generator profile. The frameset package generator profile comprises values for the known device-variability parameters. The frameset package generator is also configured to store the frameset package.

Another example embodiment of the present invention provides a distributed computing system frameset package store. The frameset package store is configured to receive, from a frameset package query interface, a query for a frameset package. The frameset query interface comprises a plurality of frameset package categories. The engine is also configured to identify a query result frameset package based on a frameset package profile. The engine is also configured to communicate the query result frameset package.

Another example embodiment of the present invention provides a distributed computing system feedback loop engine. The feedback loop engine is configured to access a training dataset report. The training dataset report identifies a synthetic data asset having values for asset-variation parameters. The synthetic data asset is associated with a frameset. The feedback loop engine is also configured to, based on the training dataset report, update the synthetic data asset with a synthetic data asset variation. The feedback engine is also configured to update the frameset using the updated synthetic data asset.

Another example embodiment of the present invention provides a distributed computing system crowdsourcing engine. The crowdsourcing engine is configured to receive a source asset from a distributed synthetic data as a service (SDaaS) crowdsource interface. The crowdsourcing engine is also configured to receive a crowdsource tag for the source asset via the distributed SDaaS crowdsource interface. The crowdsourcing engine is also configured to, based in part on the crowdsource tag, ingest the source asset. Ingesting the source asset comprises automatically computing values for asset-variation parameters of the source asset. The asset-variation parameters are programmable for machine learning. The crowd sourcing engine is also configured to generate a crowdsourced synthetic data asset comprising the values for asset-variation parameters.

Example Distributed Computing Environment

Figure 22:
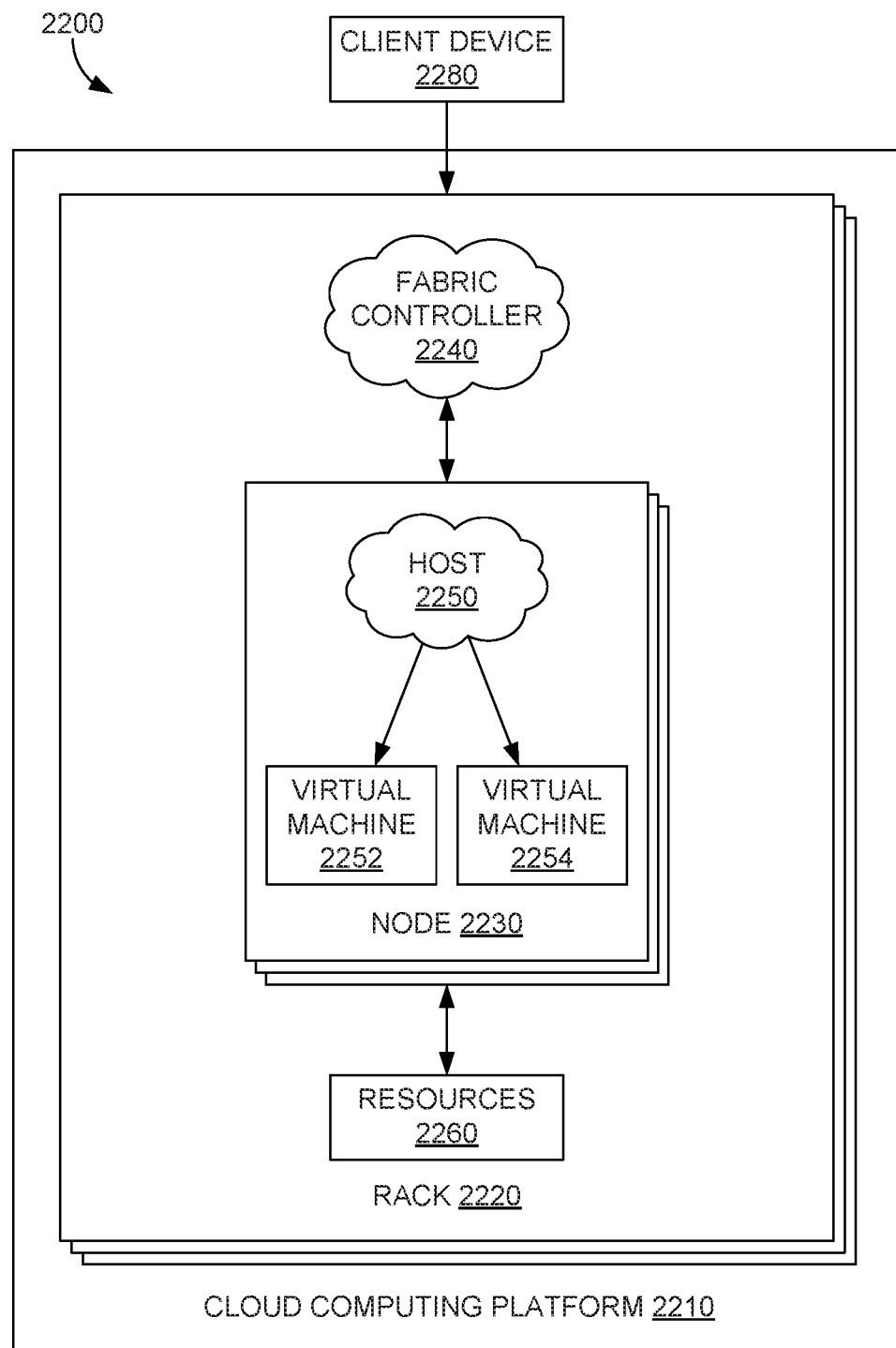
FIG. 22 is a block diagram of an example distributed computing environment suitable for use in implementing embodiments of the present invention.

Referring now to FIG. 22, FIG. 22 illustrates an example distributed computing environment 2200 in which implementations of the present disclosure may be employed. In particular, FIG. 22 shows a high level architecture of the distributed computing system synthetic data as a service in cloud computing platform 2210, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 2200 that includes cloud computing platform 2210, rack 2220, and node 2230 (e.g., computing devices, processing units, or blades) in rack 2220. The system can be implemented with cloud computing platform 2210 that runs cloud services across different data centers and geographic regions. Cloud computing platform 2210 can implement fabric controller 2240 component for provisioning and managing resource allocation, deployment, upgrade, and management of cloud services. Typically, cloud computing platform 2210 acts to store data or run service applications in a distributed manner. Cloud computing infrastructure 2210 in a data center can be configured to host and support operation of endpoints of a particular service application. Cloud computing infrastructure 2210 may be a public cloud, a private cloud, or a dedicated cloud.

Node 2230 can be provisioned with host 2250 (e.g., operating system or runtime environment) running a defined software stack on node 2230. Node 2230 can also be configured to perform specialized functionality (e.g., compute nodes or storage nodes) within cloud computing platform 2210. Node 2230 is allocated to run one or more portions of a service application of a tenant. A tenant can refer to a customer utilizing resources of cloud computing platform 2210. Service application components of cloud computing platform 2210 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 2230, nodes 2230 may be partitioned into virtual machines (e.g., virtual machine 2252 and virtual machine 2254). Physical machines can also concurrently run separate service applications. The virtual machines or physical machines can be configured as individualized computing environments that are supported by resources 2260 (e.g., hardware resources and software resources) in cloud computing platform 2210. It is contemplated that resources can be configured for specific service applications. Further, each service application may be divided into functional portions such that each functional portion is able to run on a separate virtual machine. In cloud computing platform 2210, multiple servers may be used to run service applications and perform data storage operations in a cluster. In particular, the servers may perform data operations independently but exposed as a single device referred to as a cluster. Each server in the cluster can be implemented as a node.

Client device 2280 may be linked to a service application in cloud computing platform 2210. Client device 2280 may be any type of computing device, which may correspond to computing device 2200 described with reference to FIG. 22, for example. Client device 2280 can be configured to issue commands to cloud computing platform 2210. In embodiments, client device 2280 may communicate with service applications through a virtual Internet Protocol (IP) and load balancer or other means that direct communication requests to designated endpoints in cloud computing platform 2210. The components of cloud computing platform 2210 may communicate with each other over a network (not shown), which may include, without limitation, one or more local area networks (LANs) and/or wide area networks (WANs).

Example Computing Environment

Figure 23:
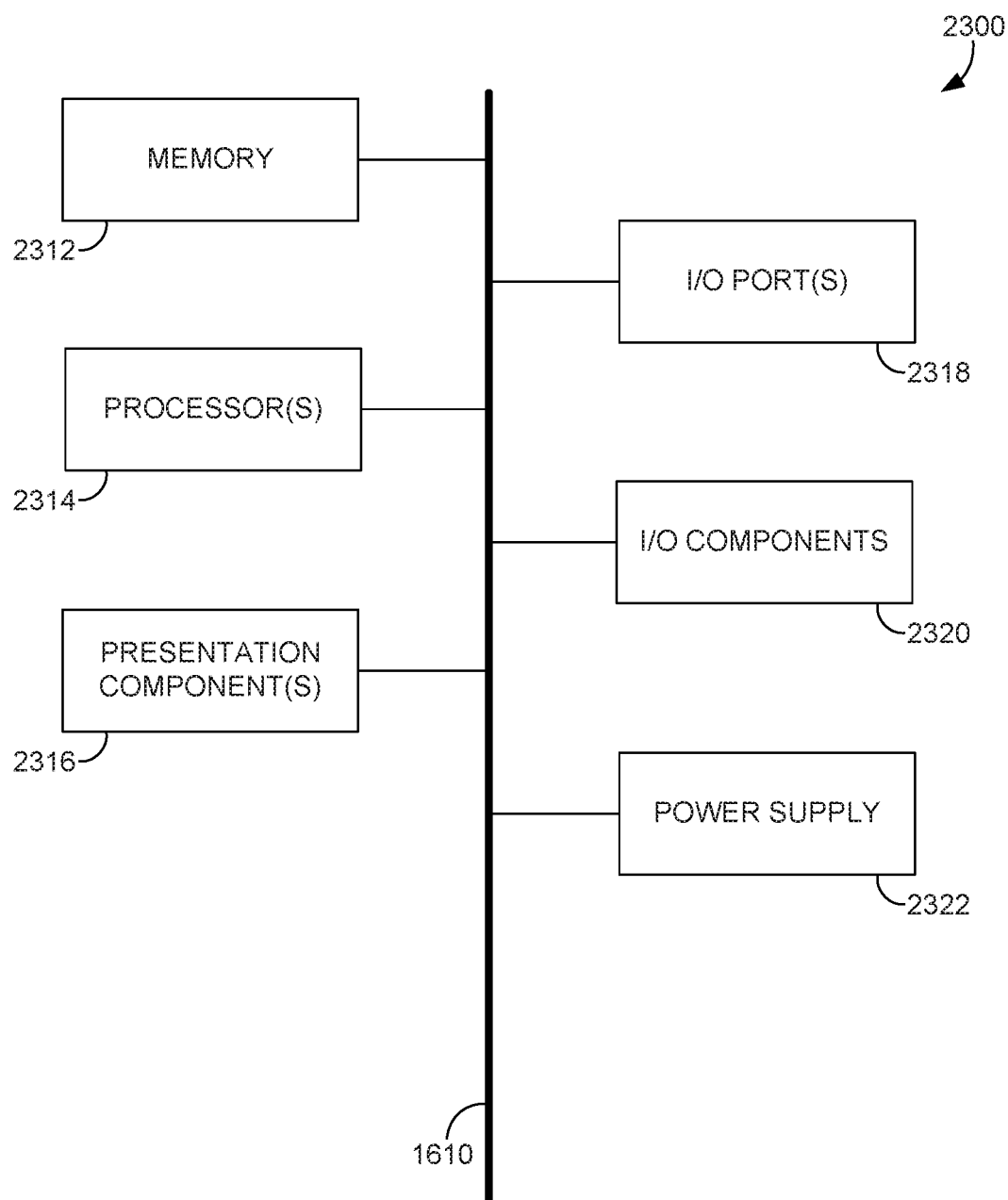
FIG. 23 is a block diagram of an example computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 23 in particular, an exemplary operating environment for implementing embodiments of the present invention is shown and designated generally as computing device 2300. Computing device 2300 is but one example of a suitable computing environment and is not intended to suggest any limitation as to the scope of use or functionality of the invention. Neither should computing device 2300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 23, computing device 2300 includes bus 2310 that directly or indirectly couples the following devices: memory 2312, one or more processors 2314, one or more presentation components 2316, input/output ports 2318, input/output components 2320, and illustrative power supply 2322. Bus 2310 represents what may be one or more buses (such as an address bus, data bus, or combination thereof). The various blocks of FIG. 23 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 23 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 23 and reference to "computing device."

Computing device 2300 typically includes a variety of computer-readable media. Computer-readable media can be any available media that can be accessed by computing device 2300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2312 includes computer storage media in the form of volatile and/or nonvolatile memory. The memory may be removable, non-removable, or a combination thereof. Exemplary hardware devices include solid-state memory, hard drives, optical-disc drives, etc. Computing device 2300 includes one or more processors that read data from various entities such as memory 2312 or I/O components 2320. Presentation component(s) 2316 present data indications to a user or other device. Exemplary presentation components include a display device, speaker, printing component, vibrating component, etc.

I/O ports 2318 allow computing device 2300 to be logically coupled to other devices including I/O components 2320, some of which may be built in. Illustrative components include a microphone, joystick, game pad, satellite dish, scanner, printer, wireless device, etc.

With reference to the distributed computing system synthetic data as a service, distributed computing system synthetic data as a service components refer to integrated components for providing a synthetic data as a service. The integrated components refer to the hardware architecture and software framework that support functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the distributed computing system synthetic data as a service can include an API library that includes specifications for routines, data structures, object classes, and variables may support the interaction between the hardware architecture of the device and the software framework of distributed computing system synthetic data as a service. These APIs include configuration specifications for the distributed computing system synthetic data as a service such that the different components therein can communicate with each other in the distributed computing system synthetic data as a service, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed computing system synthetic data as a service and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer system comprising:
   one or more hardware processors and memory configured to provide computer program instructions to the one or more hardware processors;
   a task classifier configured to use the one or more hardware processors to:
   receive, from an interface of a distributed computing environment configured to generate a training dataset comprising synthetic images, a request representing a task that supports generating the training dataset;

identify a task category of the task from a group of supported categories comprising generation or ingestion into the distributed computing environment of a 3D model or a 3D scene comprising the 3D model, simulation of a plurality of parameters representing different variations of the 3D scene, and rendering of the synthetic images from the different variations of the 3D scene;

identify a group of eligible processors of the distributed computing environment by classifying the task, based on the identified task category, as eligible for execution on only CPUs of the distributed computing environment, only GPUs of the distributed computing environment, or on either the CPUs or the GPUs; and a scheduler configured to use the one or more hardware processors to route the task to a first processor in the group of eligible processors.

2. The computer system of claim 1, wherein the simulation comprises identification of the plurality of parameters or variation of the plurality of parameters.

3. The computer system of claim 1, wherein the task is the ingestion of the 3D model into the distributed computing environment and the task classifier is configured to identify the group of eligible processors by classifying the task as eligible for processing on only the CPUs based on the identified task category being the ingestion of the 3D model.

4. The computer system of claim 1, wherein the task classifier is further configured to place the task into a queue corresponding to the group of eligible processors, and wherein the scheduler is further configured to select the task for assignment from the queue giving priority to requests to render the synthetic images.

5. The computer system of claim 1, wherein the task classifier is further configured to derive, from the request, a plurality of tasks that batch the rendering of the synthetic images.

6. The computer system of claim 1, wherein the scheduler is further configured to route the task based on a monitoring signal indicating availability of the first processor.

7. One or more computer storage media storing computer-useable instructions that, when used by one or more computing devices, cause the one or more computing devices to perform operations comprising:

receiving, from an interface of a distributed computing environment configured to generate a training dataset comprising synthetic images using a service-oriented architecture of the distributed computing environment, a request representing a task that supports generating the training dataset;

orchestrating, by the service-oriented architecture, a resource allocation by:

identifying a task category of the task from a group of supported categories comprising generation or ingestion of a 3D model or a 3D scene comprising the 3D model, simulation of a plurality of parameters representing different variations of the 3D scene, and rendering of the synthetic images from the different variations of the 3D scene;

identifying a category of eligible processors of the distributed computing environment by classifying the task, based on the identified task category, as eligible for execution on only CPUs of the distributed computing environment, only GPUs of the distributed computing environment, or on either the CPUs or the GPUs;

routing the task to a first processor in the category of eligible processors; and causing the task to be executed on the first processor.

8. The one or more computer storage media of claim 7, wherein the simulation comprises identification of the plurality of parameters or variation of the plurality of parameters.

9. The one or more computer storage media of claim 7, wherein identifying the category of the eligible processors comprises:

identifying the task category as the ingestion into the distributed computing environment of the 3D model; and classifying the task as being eligible for execution on only the CPUs of the distributed computing environment based on the identified task category being the ingestion of the 3D model.

10. The one or more computer storage media of claim 7, wherein identifying the category of the eligible processors comprises:

identifying the task category as the rendering of the synthetic images of the training dataset from the different variations of the 3D scene; and classifying the task as being eligible for execution on only the GPUs of the distributed computing environment based on the identified task category being the rendering of the synthetic images from the different variations of the 3D scene.

11. The one or more computer storage media of claim 7, wherein causing the task to be executed on the first processor comprises queuing the task into a queue corresponding to the category of eligible processors and selecting the task for assignment from the queue giving priority to requests to render the synthetic images.

12. The one or more computer storage media of claim 7, the operations further comprising routing the task based on a monitoring signal indicating availability of the first processor.

13. The one or more computer storage media of claim 7, the operations further comprising deriving, from the request, a plurality of tasks that batch the rendering of the synthetic images.

14. A method comprising:

receiving, from an interface of a distributed computing environment configured to generate a training dataset comprising synthetic images, a request representing a task that supports generating the training dataset;

orchestrating a resource allocation between groups of processors, of the distributed computing environment, with different architectures by:

identifying a task category of the task from a group of supported categories comprising generation or ingestion of a 3D model or a 3D scene comprising the 3D model, simulation of a plurality of parameters representing different variations of the 3D scene, and rendering of the synthetic images from the different variations of the 3D scene;

identifying, from the groups, a group of eligible processors of the distributed computing environment by classifying the task, based on the identified task category, as eligible for execution on only a first type of processor, on only a second type of processor, or on either the first or the second type of processor;

assigning the task to a first processor in the group of eligible processors of the distributed computing environment; and causing the task to be executed on the first processor.

15. The method of claim 14, wherein the task is the rendering of the synthetic images from the different variations of the 3D scene and identifying the group of eligible processors comprises classifying the task as eligible for execution on a GPU only based on the identified task category being the rendering of the synthetic images from the different variations of the 3D scene.

16. The method of claim 14, wherein the simulation comprises identification of the plurality of parameters or variation of the plurality of parameters.

17. The method of claim 14, wherein the task is the ingestion of the 3D model and identifying the group of eligible processors comprises classifying the task as eligible for execution on a CPU only based on the identified task category being the ingestion of the 3D model.

18. The method of claim 14, wherein the first type of processor is a CPU, the second type of processor is a GPU, and the group of eligible processors is selected from a plurality of groups comprising a group of only CPUs, a group of only GPUs, and a group of CPUs and GPUs.

19. The method of claim 14, further comprising:
queueing the task into a queue corresponding to the group of eligible processors; and
selecting the task for assignment from the queue giving priority to requests to render the synthetic images.

20. The method of claim 14, further comprising deriving, from the request, a plurality of tasks that batch the rendering of the synthetic images.

\* \* \* \* \*